United States Patent
Goh et al.

(10) Patent No.: US 12,307,021 B2
(45) Date of Patent: May 20, 2025

(54) SYSTEM AND METHOD FOR A QUIET KEYBOARD WITH OPTICAL MATRIX KEY POSITIONING

(71) Applicant: Dell Products, LP, Round Rock, TX (US)

(72) Inventors: Peng Lip Goh, Singapore (SG); Deeder M. Aurongzeb, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/385,677

(22) Filed: Oct. 31, 2023

(65) Prior Publication Data
US 2025/0138648 A1 May 1, 2025

(51) Int. Cl.
G06F 3/02 (2006.01)
(52) U.S. Cl.
CPC .................................. G06F 3/0202 (2013.01)
(58) Field of Classification Search
CPC ..................................................... G06F 3/0202
See application file for complete search history.

(56) References Cited

U.S. PATENT DOCUMENTS

| | | | | |
|---|---|---|---|---|
| 4,641,026 A * | 2/1987 | Garcia, Jr. | ............ | H03K 17/969 341/26 |
| 10,394,341 B1 * | 8/2019 | Wang | ..................... | G06F 3/0304 |
| 2004/0008505 A1 * | 1/2004 | Chiang | ................ | G02B 6/0005 362/602 |
| 2004/0227728 A1 | 11/2004 | McAlindon | | |
| 2006/0066576 A1 * | 3/2006 | Kong | ..................... | G06F 3/0213 345/168 |
| 2012/0199458 A1 * | 8/2012 | Takemae | ................ | H01H 3/125 200/344 |
| 2014/0203953 A1 | 7/2014 | Moser | | |
| 2015/0061901 A1 | 3/2015 | Casparian | | |
| 2015/0061902 A1 | 3/2015 | Casparian | | |
| 2016/0260558 A1 | 9/2016 | Casparian | | |
| 2021/0365125 A1 * | 11/2021 | Sneh | ..................... | G06F 3/0304 |
| 2022/0221909 A1 * | 7/2022 | Morrison | .................. | G05G 5/03 |
| 2022/0294444 A1 * | 9/2022 | Liu | ........................ | G06F 1/1662 |

FOREIGN PATENT DOCUMENTS

EP 0246938 A1 11/1987
EP 0246938 B1 9/1991

* cited by examiner

*Primary Examiner* — Afroza Chowdhury
(74) *Attorney, Agent, or Firm* — Prol Intellectual Property Law, PLLC; H. Kenneth Prol

(57) ABSTRACT

A keyboard includes a keyboard key cap of a keyboard key among a plurality of keyboard keys on the keyboard, where the keyboard key cap includes a key cap flange extending from a bottom surface of the keyboard key cap and a rubber dome formed under the keyboard key cap at a key location on the keyboard. A support layer is formed under the rubber dome with the support layer including a key cap flange via for the key cap flange to pass through when a user actuates the keyboard key cap. A bottom chassis is formed under the support layer to house an optical sensor in an optical sensor cavity to detect the key cap flange extending through the support layer in the key cap flange via based on reflection of light from the key cap flange to identify the keyboard key actuated.

20 Claims, 10 Drawing Sheets

SYSTEM AND METHOD FOR A QUIET KEYBOARD WITH OPTICAL MATRIX KEY POSITIONING

FIELD OF THE DISCLOSURE

The present disclosure generally relates to a keyboard. The present disclosure more specifically relates to a keyboard having a quiet keyboard keys to reduces or eliminate noises and a time-of-flight (TOF) sensor matrix to detect actuation of a keyboard key.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more gaming applications. Further, the information handling system may include any number of peripheral devices including a keyboard used to provide input to the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
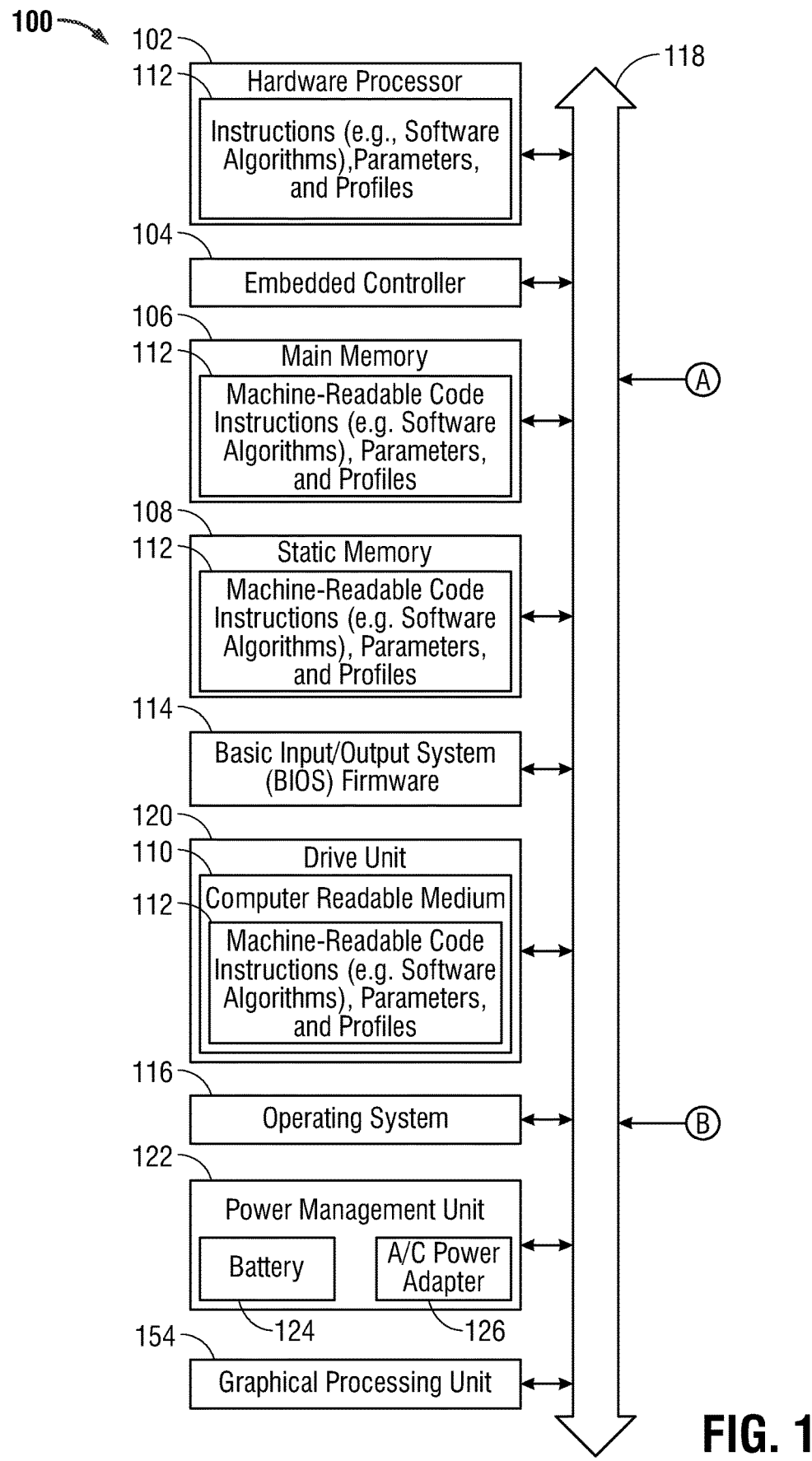
FIG. 1 is a block diagram illustrating an information handling system with a keyboard having a plurality of keyboard keys and an optical sensor to detect a key cap flange of for a keyboard key position according to an embodiment of the present disclosure.
Figure 1:
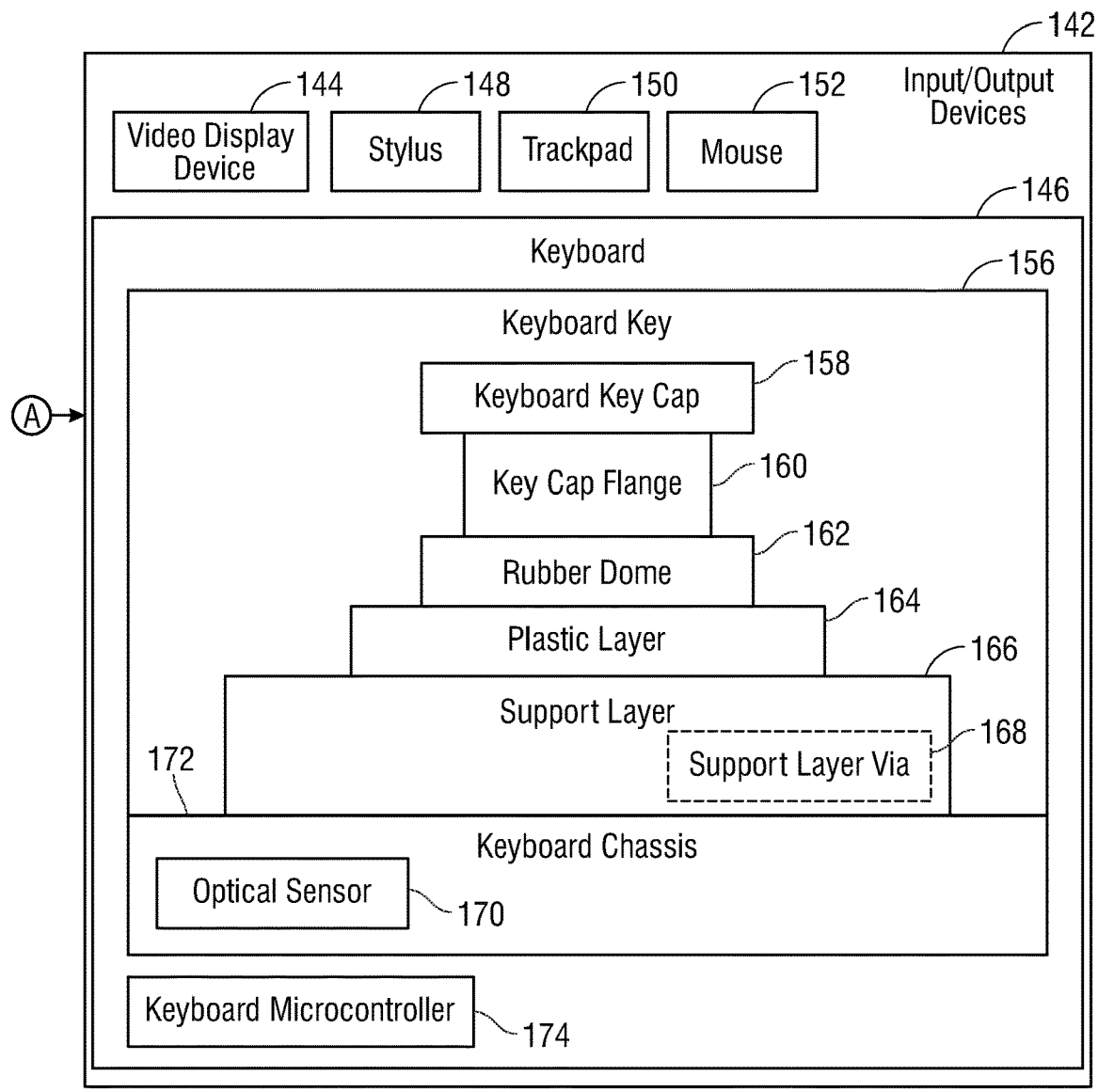
Figure 1:
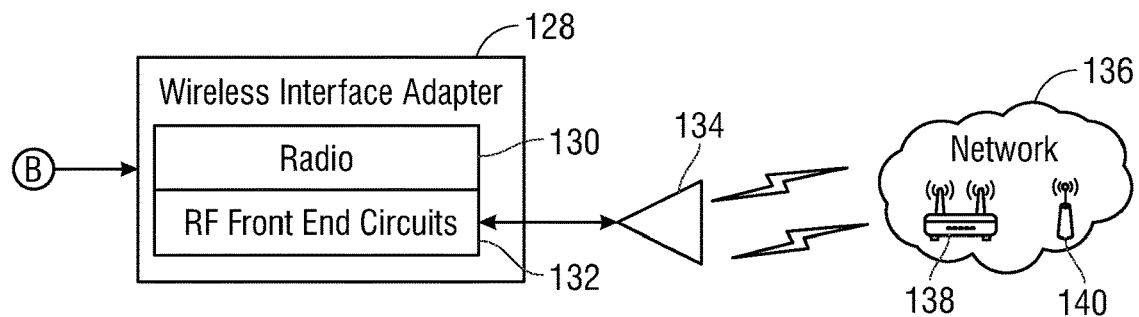

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Keyboards are used by a user to provide input to an information handling system. A keyboard may be wired or wireless. In an embodiment, the keyboard includes a plurality of keys such as those keys generally found on a QWERTY-type keyboard. Each of these keys may include a mechanical devices that secure a key cap to a body of the keyboard including a keyboard housing top layer. For example, a typical key cap may include key cap hooks formed on the key cap that mechanically interface with key hooks formed into a key well or housing top layer on the body of the keyboard. The mechanical interface between the key cap hooks and the key hooks secure the key cap to the body of the keyboard may generate noise during typing. Furthermore, as the user actuates each key, the individual keyboard keys may bottom out and hit a supporting plate, a switch plate, or other layers with the keyboard causing further noise. This mechanical interaction between the key cap hooks and the key hooks or a bottoming out of the key may cause a clacking noise as the user actuates each key. This additional noise may generate an undesirable user experience where the noise of the actuation of the keyboard keys is constant.

Continuous impact with lower layers may also wear out the switch plate layer in some cases. In some keyboards, each keyboard key may include an electrical membrane contact formed under each key. These electrical membrane contacts may lose function from wear and tear as well as break down due to dust, contaminants, and water contamination such as from spillage onto the keyboard.

The present specification describes a keyboard operatively couplable to an information handling system that includes a keyboard key cap of a keyboard key placed at a key location on the keyboard, where the keyboard key cap includes a key cap flange extending from a bottom surface of the keyboard key cap. The keyboard further includes a plastic layer formed under the keyboard key cap with the plastic layer comprising a rubber dome at the key location on the keyboard. In an embodiment, the rubber dome is injection molded into the plastic layer during an injection molded process. The keyboard further includes a support layer formed under the plastic layer wherein the support layer includes a key cap flange via in the support plate for the key cap flange to pass through without contacting when a user actuates the keyboard key cap.

Furthermore, the keyboard includes a bottom chassis formed under the support layer to house an optical sensor with a vertical optical sensor board that detects the key cap flange extending through the vias in the support layer for the key cap flange when the user has actuated the keyboard key. In an embodiment, the optical sensor is a time-of-flight (TOF) optical sensor that emits a visible or infrared (IR) light beam and detects a reflection of the beam where it hits the key cap flange that has extended through a key cap flange via. In an embodiment, a plurality of TOF optical sensors that each have a field of view to monitor a key set formed along the keyboard. Each TOF optical sensor may monitor for a key cap flange extending through the key cap flange via of the support structure within a key set and ignore any reflected light that was reflected from a key cap flange not monitored by the respective TOF optical sensor.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 154, hardware processor 102, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as the keyboard 146 described herein, a trackpad 150, a mouse 152, a stylus 148, a video/graphics display device 144, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 154, or any other processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wireless communication with the I/O devices 142 such as the keyboard 146 described herein, a mouse 152, video display device 144, stylus 148, or trackpad 150 among other peripheral devices.

The information handling system 100 further includes a video/graphics display device 144. The video/graphics display device 144 in an embodiment may function as a liquid crystal display (LCD), an organic light emitting diode (OLED), a flat panel display, or a solid-state display. Additionally, as described herein, the information handling system 100 may include one or more other I/O devices 142 including the keyboard 146 described herein that allows the user to interface with the information handling system 100 via the video/graphics display device 144 via alphanumeric input, other I/O devices 14 such as a cursor control device (e.g., a trackpad 150, or gesture or touch screen input), and/or a stylus 148, among others. Various drivers and control electronics may be operatively coupled to operate the I/O devices 142 according to the embodiments described herein. The present specification contemplates that the I/O devices 142 may be wired or wireless. In the context of the keyboard 146 described herein, the keyboard 146 is operatively coupled to the information handling system 100 via a wired or wireless connection. Where the keyboard 146 is a wireless keyboard 146, the radio 130, RF front end circuits and antenna 134 may be used to operatively couple the wireless keyboard 146 to the information handling system via, for example, a Bluetooth® or Bluetooth Low Energy (BLE) (e.g., 2.4 GHz or 6 GHz) frequency. Where the keyboard 146 is a wired keyboard 146, the keyboard 146 may be operatively coupled to the information handling system via a wired connection coupled to a universal serial bus (USB) port formed at the information handling system.

A network interface device of the information handling system 100 shown as wireless interface adapter 128 can provide connectivity among devices such as with Bluetooth® (e.g., 2.4 GHz) or to a network 136, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an AP 138 or base station 140 used to operatively couple the information handling system 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134 and other circuitry of the radio 130 such as one or more antenna ports used for wireless communications via multiple radio access technologies (RATs). The radio 130 may communicate with one or more wireless technology protocols.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a device connected to a network 136 may communicate voice, video, or data over the network 136. Further, the instructions 112 may be transmitted or received over the network 136 via the network interface device or wireless interface adapter 128.

The information handling system 100 may include a set of instructions 112 that may be executed to cause the computer system to perform any one or more of the methods or computer-based functions disclosed herein. For example, instructions 112 may be executed by a hardware processor 102, GPU 154, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 154 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 154 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 154, a video/graphic display device 144, or other wired I/O devices 142 such as the stylus 148, a keyboard 146, and a trackpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system is operatively coupled to a keyboard 146 either via a wired or wireless connection. The keyboard 146 may include a housing that houses the components of the keyboard. In an embodiment, this housing may be formed into a housing of a laptop-type information handling system 100. In an alternative embodiment, this housing may be a dedicated housing separate from the information handling system 100 via a wired connection.

In an embodiment, the keyboard 146 may include a keyboard key 156 used to provide input to an information handling system 100 when a user actuates the keyboard key 156. The arrangement and number of keyboard keys 156 formed on the keyboard 146 may vary depending on the layout of the keyboard 146. For example, where the keyboard 146 is a QWERTY-type keyboard 146, the keyboard keys 156 may include alphanumeric keys (e.g., "a," "b," "c," "1", "2," "3," etc.) function keys (e.g., "F1," "F2," "F3," etc.), as well as other keys associated with a ten-pad and those other keyboard keys 156 associated with other word processing functions (e.g., "tab," "ctrl," "caps lock," etc.). It is appreciated that other types of keyboard layouts and, therefore, varying numbers of keyboard keys 156 may be formed into the keyboard 146 and the present specification contemplates these other keyboard arrangements.

In an embodiment, the keyboard key 156 described herein includes a keyboard key cap 158. The keyboard key cap may be made of any rigid material such as plastic. In an embodiment, the keyboard key cap 158 includes a key cap flange 160. The key cap flange 160 may extend from a bottom surface of the keyboard key cap 158. In an embodiment, the key cap flange 160 may extend away from the underside of the keyboard key cap 158 such that the key cap flange 160 is generally perpendicular to a top surface of the keyboard key cap 158.

In an embodiment, the keyboard key 156 further includes a rubber dome 162 formed under each of the keyboard key caps 158 arranged on the keyboard 146. In an embodiment, each rubber dome 162 includes a hole through which each of the key cap flanges 160 of the keyboard key caps 158 may be passed through. The rubber domes 162 may each include a top portion that fits into (e.g., interference fit) a channel formed on an underside of the keyboard key cap 158 such that the keyboard key cap 158 cannot be removed from the rubber dome 162 without significant force. In an embodiment, an adhesive may be used to secure the top portion of the rubber dome 162 into the channel formed on the underside of the keyboard key cap 158. In an embodiment, the keyboard key caps 158 are heat-sealed to their respective rubber domes 162. In another embodiment, the rubber domes 162 are injection molded onto a layout of individual keyboard key caps 158 thereby securing each keyboard key cap 158 above each rubber dome 162 of the keyboard 146. In an embodiment, the sealing of the keyboard key cap 158 to the rubber domes 162 prevents contaminants such as liquids, dust, and the like, from entering into the dome formed by the rubber dome 162 thereby preventing damage to the keyboard keys 156 on the keyboard 146. In an embodiment, the rubber domes 162 are used to reduce the noise produced by the actuation of the keyboard key cap 158 by the user. As the keyboard key cap 158 is pressed down, instead of the keyboard key cap 158 hitting a hard plastic surface and creating a clacking noise, the bottom of the keyboard key cap 158 urges an outer circumference of the rubber dome 162 downward and key cap flanges 160 extend through support layer vias 168 formed in the support layer 166 without contact. An optical sensor 170 on an optical sensor board may detect the keypress from reflection off of key cap flanges 160 detect optical position of keyboard keys, thereby reducing or eliminating the noise associated with typing.

The keyboard 146 may also include a plastic layer 164 formed around the layer of rubber domes 162. In an embodiment, the plastic layer 164 may be operatively coupled to the layer of rubber domes 162 using an adhesive. In an embodiment, the layer of rubber domes 162 may be heat sealed to the plastic layer 164. In yet another embodiment, the plastic layer 164 may be injection molded onto the underside of the layer of rubber domes 162. In an embodiment, this injection molding of the plastic layer 164 onto the underside of the layer of rubber domes 162 is completed after, for example, the rubber domes 162 were injection molded onto the individual keyboard key caps 158. Similar to each of the rubber domes 162, the plastic layer 164 may include a via formed therein through which the key cap flange 160 may pass through. In an embodiment, individual keyboard key wells are formed into the plastic layer 164 where each of the keyboard key caps 158 may move up and down during actuation by the user. The length of the key cap flange 160 may extend a distance through the rubber dome 162 and plastic layer 164 when the keyboard key 156 is not actuated by a user.

The keyboard 146 may further include a support layer 166. The support layer 166 may be used to hold the keyboard key caps 158, rubber domes 162, and the plastic layer 164 above the remaining portions of the keyboard 146. The support layer 166 may also include support layer vias 168 formed therethrough below each keyboard key 156 such that, when the keyboard keys 156 are actuated by a user, the key cap flanges 160 pass through the support layer vias 168 and extend a distance below the support layer 166. The support layer 166 may be metal, plastic, or another rigid support material in embodiments herein.

The support layer 166 may be operatively coupled to a keyboard chassis 172. In an embodiment, the keyboard chassis 172 includes a flat bottom surface with walls formed along the edges. The support layer 166 may be operatively coupled to the tops of these walls of the keyboard chassis 172 such that an optical sensor cavity is formed between the support layer 166 and the keyboard chassis 172. This optical sensor cavity may house one or more optical sensors 170 that can detect when each of the key cap flanges 160 of each keyboard key 156 extends below the support layer 166 when the keyboard key 156 is actuated by a user via optical matrix key positioning. In an embodiment, the optical sensors 170 may include time-of-flight (TOF) optical sensors. A TOF optical sensor may include a visible or infrared (IR) light beam emitter such as a LASER or light-emitting diode (LED). The TOF optical sensor may also include a visible or IR light detector to detect when visible or IR light has been reflected back to the TOF optical sensor, such as to a light or IR sensing diode, from off of each of the key cap flanges 160 as they extend below the support layer 166 when a user actuates a corresponding keyboard key 156. A keyboard controller or other hardware processing resource may take the transmission and detection of reflection time to determine a TOF distance of the key cap flanges 160 that are actuated. The TOF optical sensors may include, for example, a radio-frequency-modulated light sources with phase detectors, range gated imagers, direct time-of-flight imagers, among other types of TOF optical sensors.

In an embodiment, the keyboard 146 may include a plurality of optical sensors 170 formed within the optical sensor cavity formed between the support layer 166 and the keyboard chassis 172. In an embodiment, each of these optical sensors 170 may be used to detect a key subset of keyboard keys 156. For example, a first optical sensor 170 may be used to monitor for the key cap flanges 160 of a first group of keyboard keys 156 on the keyboard 146 while a second optical sensor 170 is used to monitor for the key cap flanges 160 of a second group of keyboard keys 156 on the keyboard 146. In an embodiment, the keyboard 146 may be divided into four key sets each with an optical sensor 170 being used to monitor for key cap flanges 160 extending below the support layer 166 within its respective key set. Plural optical sensors 170 may be formed on a vertical optical sensor printed circuit board (PCB) arranged to detect in a space under the support layer 166 in the keyboard housing of the keyboard 146. This space is referred to as an optical sensor cavity. Through the use of the TOF optical sensors, a distance or optical position of each detected key cap flange 160 extending through the support plate 166 and in a field-of-view (FOV) of that TOF optical sensor may be determined via this optical matrix key positioning. The key cap flanges 160 of the keyboard keys 156 that fall outside of the key set to be detected by the TOF optical sensor or its FOV may be ignored so that another, assigned TOF optical sensor may cover detecting that key cap flange 160 instead.

As each optical sensor 170 detects a key cap flange 160 extending down past the support layer 166 due to a user actuating a keyboard key 156, time-of-flight may be used to identify which keyboard key 156 was actuated within the covered key set for that TOF optical sensor as part of the optical matrix key positioning. If the time-of-flight is longer, the detected key cap flange 160 of that key set is further away. If the time-of-flight is shorter, the key cap flange 160 is relatively closer to the optical sensor 170. Because each optical sensor 170 is assigned to a key set, the number of key cap flanges 160 to be detected is reduced thereby allowing for a relatively quicker identification of the actuated keyboard key 156. The field-of-view, in some embodiments, may be limited to cause the optical sensor 170 to monitor its key set only so that other key cap flanges 160 and keyboard keys 156 not assigned to that key set are not detected. In one example embodiment, multiple optical sensors 170 may be used to triangulate the position of the detected key cap flange 160 or to confirm that a key cap flange 160 was detected at a specific location across the keyboard 146.

As the optical sensors 170 receive this distance and optical position data of the key cap flanges 160, the distance and optical position data is sent to a hardware processing device such as a keyboard microcontroller 174. The keyboard microcontroller 174 may be mounted on a main keyboard PCB in the keyboard 146 in an embodiment. In an embodiment, the time-of-flight data that identifies the key cap flange 160 and keyboard key cap 158 location of a covered key may be cross-referenced with a keystroke look-up table. This keystroke look-up table may indicate a key code associated with a detected time-of-flight location values from an associated optical sensor 170 such that the keyboard microcontroller 174 can transmit this key code to the information handling system either via a wired connection or wireless as described herein. This key code may be received by a hardware processor 102 of the information handling system 100 and used as input data for the particular key.

Figure 2:
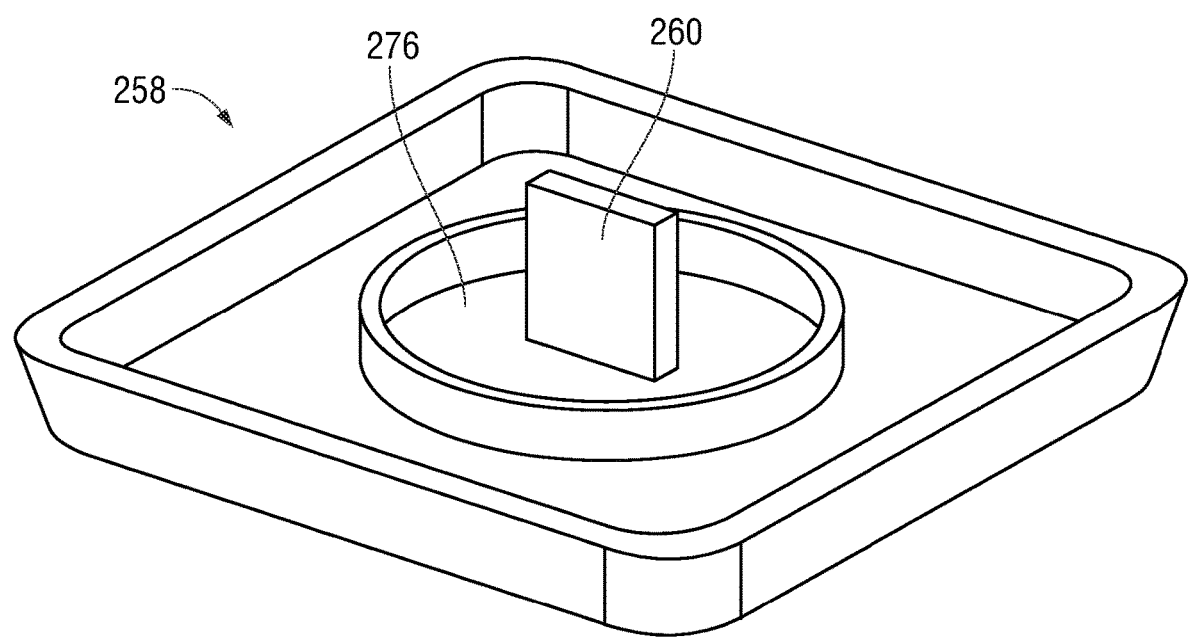
FIG. 2 is a bottom, perspective view of a keyboard key cap of a keyboard key including a key cap flange according to an embodiment of the present disclosure.

FIG. 2 is a bottom, perspective view of a keyboard key cap 258 of a keyboard key including a key cap flange 260 according to an embodiment of the present disclosure. As described herein, the keyboard key cap 258 shown in FIG. 2 may be one of a plurality of keyboard key caps 258 that form a visible layout of keyboard keys a user may use to provide input to an information handling system.

The keyboard key cap 258 shown in FIG. 2 has been inverted to show a perspective view of the underside of the keyboard key cap 258. This view shows the key cap flange 260 that extends away from the underside of the keyboard key cap 258. In an embodiment, the key cap flange 260 may extend generally perpendicular to a top surface (not shown) of the keyboard key cap 258. In an example embodiment, the key cap flange 260 is a rectangular cuboid that has a length sufficient to pass through the rubber dome, plastic layer, and support layer described herein when the keyboard key cap 258 has been actuated and pressed down by a user during typing. Any shape of the key cap flange 260 sufficient for detection by the optical sensors in the keyboard is contemplated in other embodiments. FIG. 2 shows the key cap flange 260 generally formed in the center of the keyboard key cap 258. In an embodiment, the keyboard key cap 258 and key cap flange 260 form a monolithic piece that is manufactured using, for example, an injection molding process.

As described herein, the underside of the keyboard key cap 258 may include a key cap channel cavity 276 formed on the underside of the keyboard key cap 258. The key cap channel cavity 276 may be used for inserting and operative coupling with an upper portion of the rubber dome. By inserting the upper portion of the rubber dome into this key cap channel cavity 276, the keyboard key cap 258 may be secured to the keyboard so that a force is necessary to remove the keyboard key cap 258 from the keyboard. In an embodiment, an adhesive may be layered into the key cap channel cavity 276 in order to glue the upper portion of the rubber dome into the key cap channel cavity 276. In another embodiment, the upper portion of the rubber dome is pressed into the key cap channel cavity 276 using an engineering fit such as a press fit, driving fit, or forced fit. In another embodiment, the upper portion of the rubber dome may be injection molded into the key cap channel cavity 276 such that they form a monolithic piece after the injection molding process. It is appreciated that other methods of securing the upper portion of the rubber dome into the key cap channel cavity 276 may be used in order to secure the keyboard key cap 258 to the rubber dome and the keyboard generally.

In an embodiment, the rubber dome includes a hole through which the key cap flange 260 may pass. The operative coupling between the rubber dome and the perimeter of the key cap channel cavity 276, however, forms a seal such that fluids, dust, and other contaminants cannot pass into the hole in the rubber dome formed for the key cap flange 260. The rubber dome may, however, provide a spring force against the underside of the keyboard key cap 258 so that the keyboard key cap 258 remains up until a force from the user's finger overcomes this force to actuate the keyboard key. In an embodiment, the footprint of the rubber dome may exceed the footprint of the keyboard key cap 258 such that when the keyboard key cap 258 is actuated by a user, the underside edges of the keyboard key cap 258 come into contact with a lower portion of the rubber dome. This contact limits or prevents noise from being created as the user actuates the keys.

Figure 3:
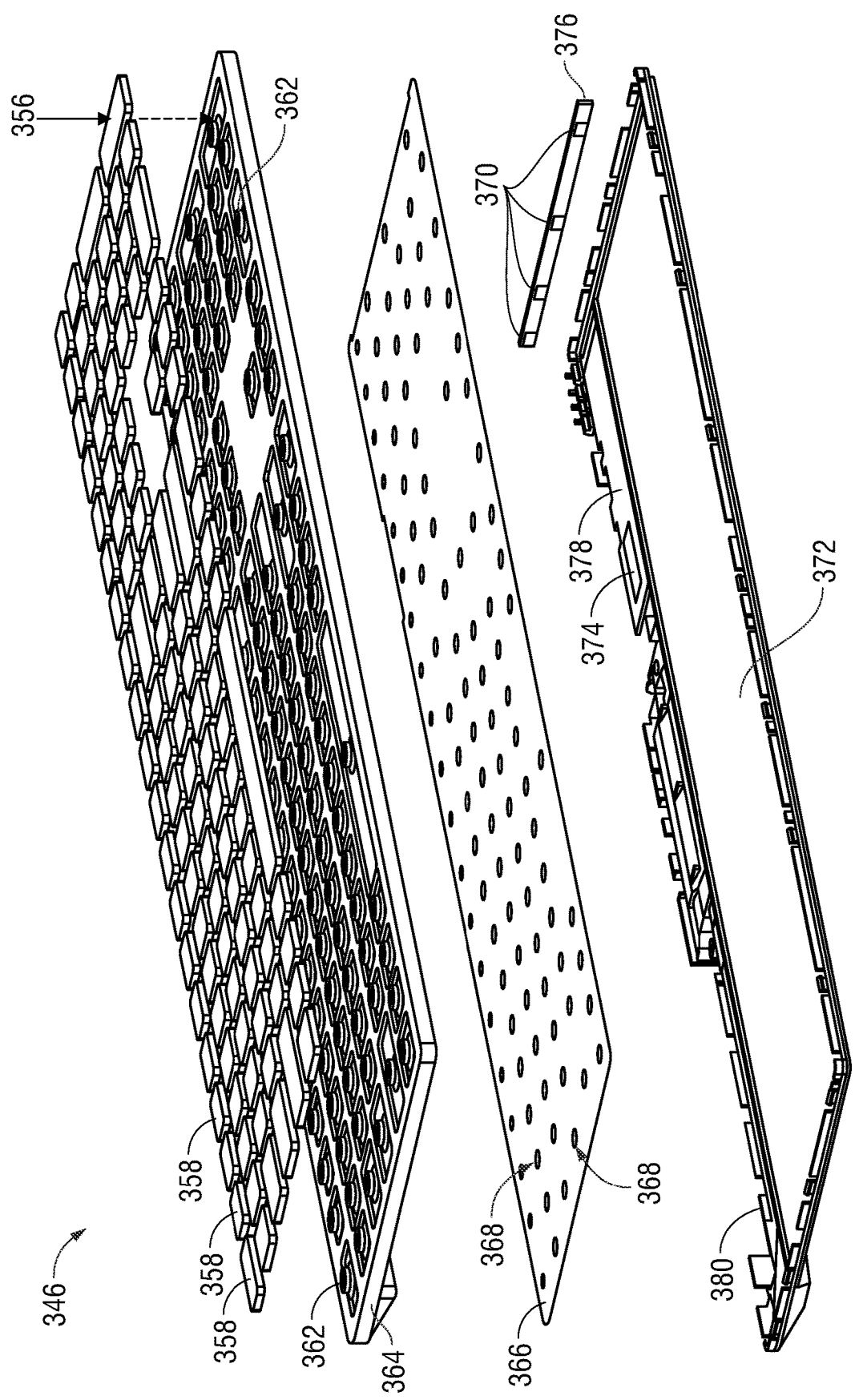
FIG. 3 is a perspective, exploded view of a keyboard including keyboard layers and a plurality of optical sensors of an optical sensor printed circuit board (PCB) to detect optical position of keyboard keys according to another embodiment of the present disclosure.

FIG. 3 is a perspective, exploded view of a keyboard 346 including keyboard keys 356 and a plurality of optical sensors 370 to detect optical position of the keyboard keys 356 according to another embodiment of the present disclosure. In an embodiment, the keyboard 346 may include a plurality of keyboard keys 356 used to provide input to an information handling system when a user actuates any of the keyboard keys 356. The arrangement and number of keyboard keys 356 formed on the keyboard 346 may vary depending on the layout of the keyboard 346. For example, where the keyboard 346 is a QWERTY-type keyboard 346, the keyboard keys 356 may include alphanumeric keys (e.g., "a," "b," "c," "1," "2," "3," etc.) function keys (e.g., "F1," "F2," "F3," etc.), as well as other keys associated with a ten-pad and those other keyboard keys 356 associated with other word processing functions (e.g., space bar, "tab," "ctrl," "caps lock," etc.). It is appreciated that other types of keyboard layouts and, therefore, varying numbers of keyboard keys 356 may be formed into the keyboard 346 and the present specification contemplates these other keyboard arrangements. In the embodiment shown in FIG. 3, a keyboard key 356 may include, at least, a keyboard key cap 358 operatively coupled to a rubber dome 362 formed into a plastic layer 364.

In an embodiment, the keyboard key 356 includes a keyboard key cap 358. The keyboard key cap 358 may be made of any rigid material such as plastic. In an embodiment, the keyboard key cap 358 includes a key cap flange (not shown). The key cap flange, as shown in FIG. 2, may extend from a bottom, underside surface of the keyboard key cap 358. In an embodiment, the key cap flange may extend away from the underside of the keyboard key cap 358 such that the key cap flange is generally perpendicular to a top surface of the keyboard key cap 358.

In an embodiment, the keyboard key 356 further includes a rubber dome 362 formed under each of the keyboard key caps 358 arranged on the keyboard 346. In an embodiment, each rubber dome 362 includes a hole through which each of the key cap flanges of the keyboard key caps 358 may be passed through. The rubber domes 362 may each include a top portion that fits into (e.g., with an interference fit) a channel formed on an underside of the keyboard key cap 358 (e.g., 276, FIG. 2) such that the keyboard key cap 358 operatively couples to and cannot be removed from the rubber dome 362 without force. In an embodiment, an adhesive may be used to secure the top portion of the rubber dome 362 into the channel formed on the underside of the keyboard key cap 358. In an embodiment, the keyboard key caps 358 are heat-sealed to their respective rubber domes 362. In another embodiment, the rubber domes 362 are injection molded onto a layout of individual keyboard key caps 358 thereby securing each keyboard key cap 358 above each rubber dome 362 of the keyboard 346. In an embodiment, the sealing of the keyboard key cap 358 to the rubber domes 362 prevents contaminants such as liquids, dust, and the like, from entering into the dome formed by the rubber dome 362 thereby preventing damage to the keyboard keys 356 on the keyboard 346. In an embodiment, the rubber domes 362 are used to reduce the noise produced by the actuation of the keyboard key cap 358 by the user. As the keyboard key cap 358 is pressed down, instead of the keyboard key cap 358 hitting or colliding with one or more hard plastic or other surfaces and creating a clacking noise, the bottom of the keyboard key cap 358 presses down on an outer circumference of the rubber dome 362 thereby reducing or eliminating the noise associated with typing.

The keyboard 346 may also include a plastic layer 364 formed as part of or supporting the layer of rubber domes 362. In an embodiment, the plastic layer 364 may be operatively coupled to the layer of rubber domes 362 using an adhesive. In an embodiment, the layer of rubber domes 362 may be heat sealed to the plastic layer 364. In yet another embodiment, the plastic layer 364 may be injection molded onto the underside of the layer of rubber domes 362 or visa versa. In an embodiment, this injection molding of the plastic layer 364 onto the underside of the layer of rubber domes 362 is completed after, for example, the rubber domes 362 were injection molded onto the individual keyboard key caps 358. Similar to each of the rubber domes 362, the plastic layer 364 may include a via formed therein through which the key cap flange may pass through. In an embodiment, individual keyboard key wells are formed into the plastic layer 364 where each of the keyboard key caps 358 may move up and down during actuation by the user and into which each of the rubber domes 362 may be placed. The length of the key cap flange may extend a distance through the rubber dome 362 and plastic layer 364 when the keyboard key 356 is not actuated by a user.

The keyboard 346 may further include a support layer 366 made of metal, plastic, or other rigid material. The support layer 366 may be used to hold the keyboard key caps 358, rubber domes 362, and the plastic layer 364 above the remaining portions of the keyboard 346 in its housing. The support layer 366 may also include support layer vias 368 formed therethrough below each keyboard key 356 such that, when the keyboard keys 356 are actuated by a user, the key cap flanges 360 may pass through the support layer vias 368 and extend a distance below the support layer 366 without contacting the support layer 366.

The support layer 366 may be operatively coupled to a keyboard chassis 372 to form an optical sensor cavity therein. The optical sensor cavity may be shielded from light other than those light sources from the optical sensors 370. In an embodiment, the keyboard chassis 372 includes a flat bottom surface with keyboard chassis walls 380 formed along the edges. The support layer 366 may be operatively coupled to the tops of these keyboard chassis walls 380 of the keyboard chassis 372 such that an optical sensor cavity is formed between the support layer 366 and the keyboard chassis 372.

In an embodiment, the optical sensor cavity formed between an underside of the support layer 366 and the keyboard chassis 372 that may house one or more optical sensors 370 that can detect when each of the key cap flanges of each keyboard key 356 extends below the support layer 366 when the keyboard key 356 is actuated by a user (e.g., when force is applied to a top surface of the keyboard key cap 358). In the embodiment shown in FIG. 3, the number of optical sensors 370 is four to cover four keysets but any member of optical sensors may be used. These optical sensors 370 may be operatively coupled to a sensor PCB 376 which is used as a support structure to arrange the optical sensors 370 within the optical sensor cavity formed between the support layer 366 and the bottom of the keyboard chassis 372. The optical sensor PCB 376 may be arranged vertically within the optical sensor cavity to detect the key cap flanges that may be actuated. The optical sensor PCB 376 may also include circuitry that allows data transmission between the optical sensors 370 to a keyboard microcontroller 374 formed on a main keyboard PCB 378. As such the optical sensor PCB 376 may include an electrical connection such as a flex ribbon or a connector that operatively couples the optical sensors 370 and optical sensor PCB 376 to the main keyboard PCB 378 and the keyboard microcontroller 374. In the embodiment shown in FIG. 3, the optical sensors 370 and optical sensor PCB 376 is placed at a right-most keyboard chassis wall 380 such that each of the optical sensors 370 may have a field of view that is horizontal in the optical sensor cavity in order to detect the key cap flanges that extend down below the bottom surface of the support layer 366.

In an embodiment, the optical sensors 370 may include TOF optical sensors. A TOF optical sensor may include an electromagnetic beam emitter such as a LASER or light-emitting diode (LED). The TOF optical sensor may also include a light detector to detect when emitted electromagnetic beam has been reflected back to the TOF optical sensor from off of each of the key cap flanges as they extend below the support layer 366 when a user actuates a corresponding keyboard key 356. The TOF optical sensors may include, for example, a radio-frequency-modulated light sources with phase detectors, range gated imagers, direct time-of-flight imagers, among other types of TOF optical sensors.

In an embodiment, each of these optical sensors 370 may be used to detect a key set of keyboard keys 356. A key subset or set of keyboard keys 356 may include a group of keyboard keys 356 that are within a field of view of each respective optical sensor 370. For example, a first optical sensor 370 may be used to monitor for the key cap flanges of a first group of keyboard keys 356 on the keyboard 346 that may include a number of keyboard keys 356 within one or more rows of keyboard keys 356 arranged on the keyboard 346. Similarly, a second optical sensor 370 is used to monitor for the key cap flanges of a second group of keyboard keys 356 on the keyboard 346 that may include a number of keyboard keys 356 within different row or rows of keyboard keys 356 arranged on the keyboard 346. In an embodiment, the keyboard 346 may be divided into four key sets with each of the four optical sensors 370 shown being used to monitor for key cap flanges extending below the support layer 366 within their respective key sets. Through the use of the TOF optical sensors, a distance of each detected key cap flange may be determined and the key cap flanges of the keyboard keys 356 that fall outside of the key set to be detected by the TOF optical sensor may be ignored so that another, assigned optical TOF sensor may detect that key cap flange instead.

As each optical sensor 370 detects a key cap flange extending down past the support layer 366 due to a user actuating a keyboard key 356, time-of-flight may be used to identify which keyboard key 356 was actuated. If the time-of-flight is longer, the detected key cap flange is associated with a keyboard key 356 that is relatively far away from the optical sensor 370. If the time-of-flight is shorter, the key cap flange associated with the keyboard key 356 is relatively closer to the optical sensor 370 and so forth. Because each optical sensor 370 is assigned to a designated key set in a field-of-view of that optical sensor 370, the number of key cap flanges to be detected is reduced thereby allowing for a relatively quicker identification of the actuated keyboard key 356. The field-of-view, in some embodiments, may be limited to cause the optical sensor 370 to monitor its key set only so that other key cap flanges and keyboard keys 356 not assigned to that key set are not detected. In some embodiments, multiple optical sensors 370 may be used to triangulate the position of the detected key cap flange or to confirm that a key cap flange 360 was detected at a specific location across the keyboard 346.

As the optical sensors 370 receive this location or optical position data of the key cap flanges based on which optical sensor 370 and a determined TOF distance, the optical position data is sent to a hardware processing device such as the keyboard microcontroller 374. In an embodiment, the time-of-flight data for a particular optical sensor 370 that defines the key cap flange and keyboard key cap 358 location may be cross-referenced with a keystroke look-up table. This keystroke look-up table may indicate a key code associated with a detected time-of-flight for a particular optical sensor 370 such that the keyboard microcontroller 374 can transmit this key code to the information handling system either via a wired connection or wireless as described herein. This key code may be received by a hardware processor (e.g., FIG. 1, 102) of the information handling system and used as keystroke input data.

It is appreciated that the keyboard 346 shown in FIG. 3 may include a stand-alone keyboard that is separate from the information handling system. The keyboard 346 shown in FIG. 3 may be a wired or wireless keyboard 346 so that the input data received at the keyboard 346 is transmitted to the information handling system as described herein. It is appreciated that the keyboard 346 may be formed into a base chassis of a laptop-type information handling system as well. In a laptop-type information handling system, the keyboard chassis 372 and keyboard chassis wall 380 may also serve as a bottom chassis of the base chassis of the laptop-type information handling system.

Figure 4A:
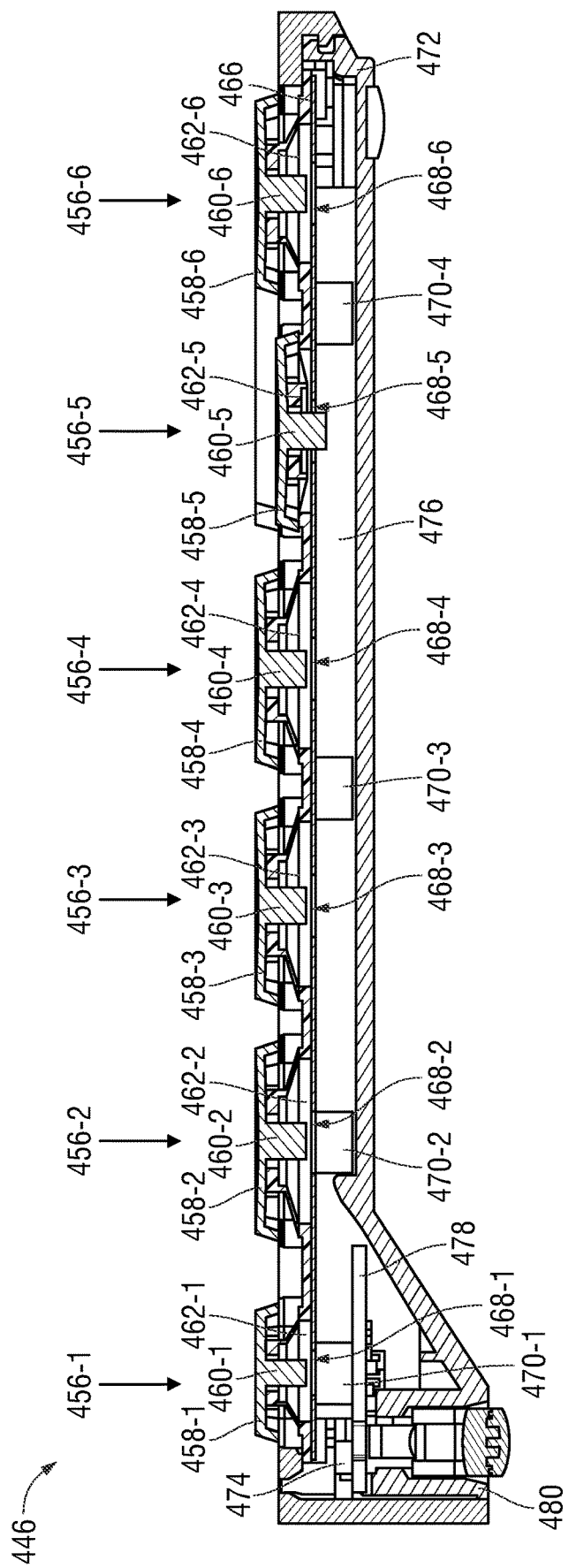
FIG. 4A is a side, cross-sectional view of a keyboard including a keyboard key and a plurality of optical sensors of an optical sensor printed circuit board (PCB) to detect optical position of keyboard keys according to another embodiment of the present disclosure.

FIG. 4A is a side, cross-sectional view of a keyboard 446 including a plurality of keyboard keys 456-1, 456-2, 456-3, 456-4, 456-5, 456-6 and a plurality of optical sensors 470-1, 470-2, 470-3, 470-4 to detect optical position of the keyboard keys 456-1, 456-2, 456-3, 456-4, 456-5, 456-6 according to another embodiment of the present disclosure. It is appreciated that FIG. 4 shows a portion of the keyboard 446 and any number of keyboard keys 456-1, 456-2, 456-3, 456-4, 456-5, 456-6 may be arranged across the keyboard 446 as shown in FIG. 3 for example.

In an embodiment, the keyboard 446 may include a plurality of keyboard keys 456-1, 456-2, 456-3, 456-4, 456-5, 456-6 used to provide input to an information handling system when a user actuates the individual keyboard keys 456-1, 456-2, 456-3, 456-4, 456-5, 456-6. The arrangement and number of keyboard keys 456-1, 456-2, 456-3, 456-4, 456-5, 456-6 formed on the keyboard 446 may vary depending on the layout of the keyboard 446. For example, where the keyboard 446 is a QWERTY-type keyboard 346, the keyboard keys 356 may include alphanumeric keys (e.g., "a," "b," "c," "1," "2," "3," etc.) function keys (e.g., "F1," "F2," "F3," etc.), as well as other keys associated with a ten-pad and those other keyboard keys 356 associated with other word processing functions (e.g., space bar, "tab," "ctrl," "caps lock," etc.). It is appreciated that other types of keyboard layouts and, therefore, varying numbers of keyboard keys 456-1, 456-2, 456-3, 456-4, 456-5, 456-6 may be formed into the keyboard 446 and the present specification contemplates these other keyboard arrangements. In the embodiment shown in FIG. 4, each of the six keyboard keys 456-1, 456-2, 456-3, 456-4, 456-5, 456-6 shown may include, at least, a respective keyboard key cap 458-1, 458-2, 458-3, 458-4, 458-5, 458-6 operatively coupled to a respective rubber dome 462-1, 462-2, 462-3, 462-4, 462-5, 462-6 formed into a plastic layer 464.

In an embodiment, each of the plurality of keyboard keys 456-1, 456-2, 456-3, 456-4, 456-5, 456-6 includes a keyboard key cap 458-1, 458-2, 458-3, 458-4, 458-5, 458-6. The keyboard key caps 458-1, 458-2, 458-3, 458-4, 458-5, 458-6 may be made of any rigid material such as plastic. In an embodiment, each of the plurality of keyboard key caps 458-1, 458-2, 458-3, 458-4, 458-5, 458-6 include a key cap flange 460-1, 460-2, 460-3, 460-4, 460-5, 460-6. Each of the plurality of key cap flanges 460-1, 460-2, 460-3, 460-4, 460-5, 460-6, as shown in FIG. 4, may extend from a bottom, underside surface of each of the plurality of keyboard key caps 458-1, 458-2, 458-3, 458-4, 458-5, 458-6. In an embodiment, the key cap flanges 460-1, 460-2, 460-3, 460-4, 460-5, 460-6 may extend away from the underside of their respective keyboard key cap 458-1, 458-2, 458-3, 458-4, 458-5, 458-6 such that the key cap flanges 460-1, 460-2, 460-3, 460-4, 460-5, 460-6 are generally perpendicular to a top surface of each of the plurality of keyboard key caps 458-1, 458-2, 458-3, 458-4, 458-5, 458-6.

In an embodiment, each of the plurality of keyboard keys 456-1, 456-2, 456-3, 456-4, 456-5, 456-6 further includes a rubber domes 462-1, 462-2, 462-3, 462-4, 462-5, 462-6 formed under each of the keyboard key caps 458-1, 458-2, 458-3, 458-4, 458-5, 458-6 arranged on the keyboard 446. In an embodiment, each of the plurality of rubber domes 462-1, 462-2, 462-3, 462-4, 462-5, 462-6 includes a hole through which each of the key cap flanges 460-1, 460-2, 460-3, 460-4, 460-5, 460-6 of the keyboard key caps 458-1, 458-2, 458-3, 458-4, 458-5, 458-6 may be passed through. The rubber domes 462-1, 462-2, 462-3, 462-4, 462-5, 462-6 may each include a top portion that fits into (e.g., interference fit) a channel formed on an underside of each of the plurality of keyboard key caps 458-1, 458-2, 458-3, 458-4, 458-5, 458-6 (e.g., 276, FIG. 2) such that the keyboard key caps 458-1, 458-2, 458-3, 458-4, 458-5, 458-6 cannot be removed from their respective rubber domes 462-1, 462-2, 462-3, 462-4, 462-5, 462-6 without significant force. In an embodiment, an adhesive may be used to secure the top portion each of the plurality of rubber domes 462-1, 462-2, 462-3, 462-4, 462-5, 462-6 into the channel formed on the underside of the respective keyboard key cap 458-1, 458-2, 458-3, 458-4, 458-5, 458-6. In an embodiment, the keyboard key caps 458-1, 458-2, 458-3, 458-4, 458-5, 458-6 are heat-sealed to their respective rubber domes 462-1, 462-2, 462-3, 462-4, 462-5, 462-6. In another embodiment, the rubber domes 462-1, 462-2, 462-3, 462-4, 462-5, 462-6 are injection molded onto a layout of individual keyboard key caps 458-1, 458-2, 458-3, 458-4, 458-5, 458-6 thereby securing each keyboard key cap 458-1, 458-2, 458-3, 458-4, 458-5, 458-6 above each of the plurality of rubber domes 462-1, 462-2, 462-3, 462-4, 462-5, 462-6 of the keyboard 446. In an embodiment, the sealing of each of the plurality of keyboard key caps 458-1, 458-2, 458-3, 458-4, 458-5, 458-6 to their respective rubber domes 462-1, 462-2, 462-3, 462-4, 462-5, 462-6 prevents contaminants such as liquids, dust, and the like, from entering into the dome formed by the rubber domes 462-1, 462-2, 462-3, 462-4, 462-5, 462-6 thereby preventing damage to the keyboard keys 456-1, 456-2, 456-3, 456-4, 456-5, 456-6 on the keyboard 446. In an embodiment, each of the plurality of rubber domes 462-1, 462-2, 462-3, 462-4, 462-5, 462-6 are used to reduce the noise produced by the actuation of the keyboard key caps 458-1, 458-2, 458-3, 458-4, 458-5, 458-6 by the user. As each of the plurality of keyboard key caps 458-1, 458-2, 458-3, 458-4, 458-5, 458-6 are pressed down, instead of the keyboard key caps 458-1, 458-2, 458-3, 458-4, 458-5, 458-6 hitting a hard plastic surface and creating a clacking noise, the bottom of each of the plurality of keyboard key caps 458-1, 458-2, 458-3, 458-4, 458-5, 458-6 hits an outer circumference of a rubber dome 462-1, 462-2, 462-3, 462-4, 462-5, 462-6 thereby reducing or eliminating the noise associated with typing.

The keyboard 446 may also include a plastic layer 464 formed around, as part of, or supporting the array or layer of rubber domes 462-1, 462-2, 462-3, 462-4, 462-5, 462-6. In an embodiment, the plastic layer 464 may be operatively coupled to the plurality of rubber domes 462-1, 462-2, 462-3, 462-4, 462-5, 462-6 using an adhesive. In an embodiment, the plurality of rubber domes 462-1, 462-2, 462-3, 462-4, 462-5, 462-6 may be heat sealed to the plastic layer 464. In yet another embodiment, the plastic layer 464 may be injection molded onto the underside of the plurality of rubber domes 462-1, 462-2, 462-3, 462-4, 462-5, 462-6. In an embodiment, this injection molding of the plastic layer 464 onto the underside of each of the plurality of rubber domes 462-1, 462-2, 462-3, 462-4, 462-5, 462-6 is completed after, for example, the rubber domes 462-1, 462-2, 462-3, 462-4, 462-5, 462-6 were injection molded onto the individual keyboard key caps 458-1, 458-2, 458-3, 458-4, 458-5, 458-6. Similar to each of the rubber domes 462-1, 462-2, 462-3, 462-4, 462-5, 462-6, the plastic layer 464 may include a via formed therein through which the key cap flanges 460-1, 460-2, 460-3, 460-4, 460-5, 460-6 of each of the keyboard key caps 458-1, 458-2, 458-3, 458-4, 458-5, 458-6 may pass through. In an embodiment, individual keyboard key wells are formed into the plastic layer 464 where each of the keyboard key caps 458-1, 458-2, 458-3, 458-4, 458-5, 458-6 may move up and down during actuation by the user and into which each of the rubber domes 462-1, 462-2, 462-3, 462-4, 462-5, 462-6 may be placed. The length of the key cap flanges 460-1, 460-2, 460-3, 460-4, 460-5, 460-6 may extend a distance through their respective rubber domes 462-1, 462-2, 462-3, 462-4, 462-5, 462-6 and plastic layer 464 when the keyboard keys 456-1, 456-2, 456-3, 456-4, 456-5, 456-6 are not actuated by a user. For example, a first keyboard key 456-1, second keyboard key 456-2, third keyboard key 456-3, fourth keyboard key 456-4, and sixth keyboard key 456-6 are shown as being in an unactuated state. In this unactuated state, the key cap flanges 460-1, 460-2, 460-3, 460-4, 460-6 of these keyboard key caps 458-1, 458-2, 458-3, 458-4, 458-6 may not extend entirely through the vias formed through the rubber domes 462-1, 462-2, 462-3, 462-4, 462-5, 462-6 and the plastic layer 464. However, FIG. 4A also shows a fifth keyboard key 456-5 in an actuated state. In this actuated state, the key cap flange 460-5 of the fifth keyboard key 456-5 extends through the entirety of the rubber dome 462-5 and plastic layer 464 and through a support layer via 468-5 formed through the support layer 466. As described herein, this extension of the key cap flange 460-5 of the fifth keyboard key 456-5 below the support layer 466 allows one or more optical sensors 470-1, 470-2, 470-3, 470-4 to detect the actuation and signal the keyboard microcontroller 474 that the fifth keyboard key 456-5 has been actuated.

The keyboard 446 may further include a support layer 466. The support layer 466 may be a rigid metal or plastic layer used to hold the keyboard key caps 458-1, 458-2, 458-3, 458-4, 458-5, 458-6, rubber domes 462-1, 462-2, 462-3, 462-4, 462-5, 462-6, and the plastic layer 464 above the remaining portions of the keyboard 446 including an optical sensor cavity. The support layer 466 may also include support layer vias 468-1, 468-2, 468-3, 468-4, 468-5, 468-6 formed therethrough below each of the plurality of keyboard keys 456-1, 456-2, 456-3, 456-4, 456-5, 456-6 such that, when each of the plurality of keyboard keys 456-1, 456-2, 456-3, 456-4, 456-5, 456-6 are actuated by a user, their respective key cap flanges 460-1, 460-2, 460-3, 460-4, 460-5, 460-6 may pass through the respective support layer vias 468-1, 468-2, 468-3, 468-4, 468-5, 468-6 and extend a distance below the support layer 466.

The support layer 466 may be operatively coupled to a keyboard chassis 472. In an embodiment, the keyboard chassis 472 includes a flat bottom surface with keyboard chassis walls 480 formed along the edges. The support layer 466 may be operatively coupled to the tops of these keyboard chassis walls 480 of the keyboard chassis 472 such that the optical sensor cavity is formed between the support layer 466 and the keyboard chassis 472. This optical sensor cavity may be shielded rom outside light.

In an embodiment, the optical sensor cavity formed between an underside of the support layer 466 and the keyboard chassis 472 that may house a plurality of optical sensors 470-1, 470-2, 470-3, 470-4 that can detect when each of the key cap flanges 460-1, 460-2, 460-3, 460-4, 460-5, 460-6 of each keyboard keys 456-1, 456-2, 456-3, 456-4, 456-5, 456-6 extends below the support layer 466 when the keyboard keys 456-1, 456-2, 456-3, 456-4, 456-5, 456-6 are actuated by a user (e.g., when force is applied to a top surface of the keyboard key caps 458-1, 458-2, 458-3, 458-4, 458-5, 458-6). In the embodiment shown in FIG. 4A, for example, the number of optical sensors 470-1, 470-2, 470-3, 470-4 is four. These optical sensors 470-1, 470-2, 470-3, 470-4 may be operatively coupled to an optical sensor PCB 476 which is arranged vertically on the side of the optical sensor cavity and used as a support structure to arrange the optical sensors 470-1, 470-2, 470-3, 470-4 within the optical sensor cavity formed between the support layer 466 and the keyboard chassis 472. The optical sensor PCB 476 may also include circuitry that allows data transmission between the plurality of optical sensors 470-1, 470-2, 470-3, 470-4 to a keyboard microcontroller 474 formed on a main keyboard PCB 478. As such the optical sensor PCB 476 may include an electrical connection such as a flex ribbon or connector that operatively couples the plurality of optical sensors 470-1, 470-2, 470-3, 470-4 and optical sensor PCB 476 to the main keyboard PCB 478 and the keyboard microcontroller 474. In the embodiment shown in FIG. 4A, the plurality of optical sensors 470-1, 470-2, 470-3, 470-4 and optical sensor PCB 476 is placed at a right-most keyboard chassis wall 480 such that each of the plurality of optical sensors 470-1, 470-2, 470-3, 470-4 may have a field of view that is horizontal in order to detect the key cap flanges 460-1, 460-2, 460-3, 460-4, 460-5, 460-6 that extend down below the bottom surface of the support layer 466 and into the optical sensor cavity.

In an embodiment, the plurality of optical sensors 470-1, 470-2, 470-3, 470-4 may include TOF optical sensors. A TOF optical sensor may include an visible or IR light beam emitter such as a LASER or light-emitting diode (LED). The TOF optical sensor may also include a visible or IR light detector to detect when emitted electromagnetic beam has been reflected back to the TOF optical sensor from off of each of the key cap flanges as they extend below the support layer 466 when a user actuates a corresponding keyboard key 456-1, 456-2, 456-3, 456-4, 456-5, 456-6. The TOF optical sensors may include, for example, a radio-frequency-modulated light sources with phase detectors, range gated imagers, direct time-of-flight imagers, among other types of TOF optical sensors.

In an embodiment, each of these optical sensors 470-1, 470-2, 470-3, 470-4 may be used to detect a designated key set among keyboard keys 456-1, 456-2, 456-3, 456-4, 456-5, 456-6. A key set of keyboard keys 456-1, 456-2, 456-3, 456-4, 456-5, 456-6 may include a group of keyboard keys 456-1, 456-2, 456-3, 456-4, 456-5, 456-6 that are within a field of view of each respective optical sensor 470-1, 470-2, 470-3, 470-4. For example, a first optical sensor 470-1 may be used to monitor for the key cap flanges 460-1, 460-2, 460-3, 460-4, 460-5, 460-6 of a first group of keyboard keys on the keyboard 446 that may include a number of keyboard keys 456 within one or more rows of keyboard keys arranged on the keyboard 446. Similarly, a second optical sensor 470-2 is used to monitor for the key cap flanges 460-1, 460-2, 460-3, 460-4, 460-5, 460-6 of a second group of keyboard keys on the keyboard 446 that may include a number of keyboard keys within different row or rows of keyboard keys arranged on the keyboard 446. In an embodiment, the keyboard 446 may be divided into four key sets with each of the four optical sensors 470-1, 470-2, 470-3, 470-4 shown being used to monitor for key cap flanges 460-1, 460-2, 460-3, 460-4, 460-5, 460-6 extending below the support layer 466 within their respective key sets. Through the use of the TOF optical sensors, a distance of each detected key cap flange may be determined and the key cap flanges of the keyboard keys 456-1, 456-2, 456-3, 456-4, 456-5, 456-6 assigned to each optical sensor 470-1, 470-2, 470-3, 470-4 that fall outside of the key set to be detected by the TOF optical sensor may be ignored so that another, assigned TOF optical sensor may detect that key cap flange instead.

As each optical sensor 470-1, 470-2, 470-3, 470-4 detects a key cap flange 460-1, 460-2, 460-3, 460-4, 460-5, 460-6 extending down past the support layer 466 due to a user actuating a keyboard key 456-1, 456-2, 456-3, 456-4, 456-5, 456-6, time-of-flight may be used to identify which keyboard key 456-1, 456-2, 456-3, 456-4, 456-5, 456-6 of the designated key set was actuated. If the time-of-flight is longer, the detected key cap flange 460-1, 460-2, 460-3, 460-4, 460-5, 460-6 is associated with a keyboard key 456-1, 456-2, 456-3, 456-4, 456-5, 456-6 that is relatively far away from the optical sensor 470-1, 470-2, 470-3, 470-4. If the time-of-flight is shorter, the key cap flange 460-1, 460-2, 460-3, 460-4, 460-5, 460-6 associated with the keyboard key 456-1, 456-2, 456-3, 456-4, 456-5, 456-6 is relatively closer to the optical sensor 470-1, 470-2, 470-3, 470-4. Because each optical sensor 470-1, 470-2, 470-3, 470-4 is assigned to a key set, the number of key cap flanges 460-1, 460-2, 460-3, 460-4, 460-5, 460-6 to be detected is reduced thereby allowing for a relatively quicker identification of the actuated keyboard key 456-1, 456-2, 456-3, 456-4, 456-5, 456-6. The field-of-view, in some embodiments, may be limited to cause the optical sensors 470-1, 470-2, 470-3, 470-4 to monitor its key set only so that other key cap flanges 460-1, 460-2, 460-3, 460-4, 460-5, 460-6 and keyboard keys 456-1, 456-2, 456-3, 456-4, 456-5, 456-6 not assigned to that key set are not detected. In some embodiments, multiple optical sensors 470-1, 470-2, 470-3, 470-4 may be used to triangulate the position of the detected key cap flange 460-1, 460-2, 460-3, 460-4, 460-5, 460-6 or to confirm that a key cap flange 460-1, 460-2, 460-3, 460-4, 460-5, 460-6 was detected at a specific location across the keyboard 446.

As the optical sensors 470-1, 470-2, 470-3, 470-4 receive this optical position data of the key cap flanges 460-1, 460-2, 460-3, 460-4, 460-5, 460-6, the optical position data is sent to a hardware processing device such as the keyboard microcontroller 474. In an embodiment, the time-of-flight data that defines the key cap flange 460-1, 460-2, 460-3, 460-4, 460-5, 460-6 and keyboard key cap 458-1, 458-2, 458-3, 458-4, 458-5, 458-6 location may be cross-referenced with a keystroke look-up table. This keystroke look-up table may indicate a key code associated with a detected time-of-flight such that the keyboard microcontroller 474 can transmit this key code to the information handling system either via a wired connection or wireless connection as described herein. This key code may be received by a hardware processor (e.g., FIG. 1, 102) of the information handling system and used as keystroke input data.

It is appreciated that the keyboard 446 shown in FIG. 4A may include a stand-alone keyboard that is separate from the information handling system. The keyboard 446 shown in FIG. 4A may be a wired or wireless keyboard 446 so that the input data received at the keyboard 446 is transmitted to the information handling system as described herein. It is appreciated that the keyboard 446 may be formed into a base chassis of a laptop-type information handling system as well. In a laptop-type information handling system, the keyboard chassis 472 and keyboard chassis wall 480 may also serve as a bottom chassis of the base chassis of the laptop-type information handling system.

Figure 4B:
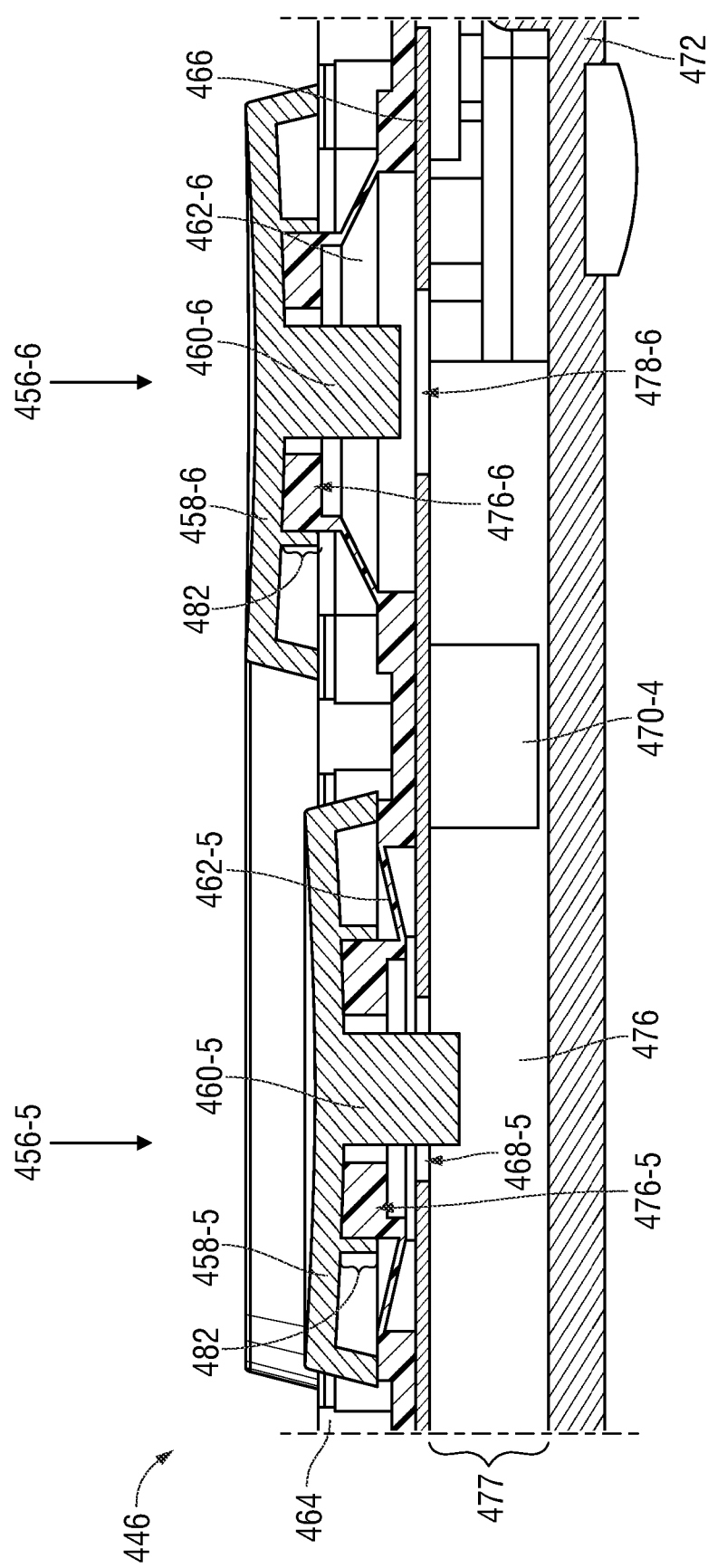
FIG. 4B is a side, cross-sectional view of a keyboard including a plurality of keyboard keys and an optical sensor to detect optical position of the keyboard keys according to another embodiment of the present disclosure.

FIG. 4B is a side, cross-sectional view of a keyboard 446 including a plurality of keyboard keys 456-5, 456-6 and an optical sensor 470-4 to detect optical position of the keyboard keys 456-5 and 456-6 according to another embodiment of the present disclosure. FIG. 4B shows an enlarged view of the fifth keyboard key 456-5 and sixth keyboard key 456-6 as indicated in FIG. 4A. Similar elements shown in FIG. 4A are also shown in FIG. 4B including a fifth keyboard key 456-5, sixth keyboard key 456-6, fifth keyboard key cap 458-5, sixth keyboard key cap 458-6, fifth key cap flange 460-5, sixth key cap flange 460-6, fifth rubber dome 462-5, sixth rubber dome 462-6, plastic layer 464, support layer 466, fifth support layer via 468-5, sixth support layer via 468-6, fourth optical sensor 470-4, keyboard chassis 472, and optical sensor PCB 476.

FIG. 4B shows the enlarged view of the fifth keyboard key 456-5 and sixth keyboard key 456-6 with the fifth keyboard key 456-5 being in an actuated state and the sixth keyboard key 456-6 being in an unactuated state. As shown, the fifth keyboard key 456-5 and sixth keyboard key 456-6 includes a fifth key cap channel cavity 476-5 and a sixth key cap channel cavity 476-6. The fifth key cap channel cavity 476-5 may receive an upper portion 482 of the fifth rubber dome 462-5. Similarly, the sixth key cap channel cavity 476-6 may receive an upper portion 482 of the sixth rubber dome 462-6. In an embodiment, an adhesive may be used to secure the upper portion 482 of the fifth rubber dome 462-5 and sixth rubber dome 462-6 into the fifth key cap channel cavity 476-5 and sixth key cap channel cavity 476-6, respectively, formed on the underside of the fifth keyboard key cap 458-5 and sixth keyboard key cap 458-6. In an embodiment, the fifth keyboard key cap 458-5 and sixth keyboard key cap 458-6 are heat-sealed to their respective rubber domes 462-5, 462-6. In another embodiment, the rubber domes 462-5, 462-6 are injection molded onto a layout of individual keyboard key caps 458-5, 458-6 thereby securing each keyboard key cap 458-5, 458-6 above each rubber dome 462-5, 462-6 of the keyboard 446. In an embodiment, the sealing of the keyboard key caps 458-5, 458-6 to their respective rubber domes 462-5, 462-6 prevents contaminants such as liquids, dust, and the like, from entering into the dome formed by the rubber domes 462-5, 462-6 thereby preventing damage to the keyboard keys 456-5, 456-6 on the keyboard 446. In an embodiment, the rubber domes 462-5, 462-6 are used to reduce the noise produced by the actuation of the keyboard key caps 458-5, 458-6 by the user. As the keyboard key caps 458-5, 458-6 are pressed down, instead of the keyboard key caps 458-5, 458-6 hitting one or more hard plastic surfaces and creating a clacking noise, the bottom of the keyboard key caps 458-5, 458-6 hit an outer circumference of the rubber domes 462-5, 462-6 thereby reducing or eliminating the noise associated with typing.

FIG. 4B also shows a fifth keyboard key 456-5 in an actuated state. In this actuated state, the key cap flange 460-5 of the fifth keyboard key 456-5 extends through the entirety of the rubber dome 462-5 and plastic layer 464 and through a support layer via 468-5 formed through the support layer 466 into the optical sensor cavity 477. As described herein, this extension of the key cap flange 460-5 of the fifth keyboard key 456-5 below the support layer 466 and allows one or more optical sensors 470-1, 470-2, 470-3, 470-4 to detect the actuation and signal the keyboard microcontroller 474 that the fifth keyboard key 456-5 has been actuated. FIG. 4B also shows the state of the fifth rubber dome 462-5 as the fifth keyboard key 456-5 is actuated and the fifth keyboard key cap 458-5 is moved down. The fifth rubber dome 462-5 is shown to be deformed downward. As the actuation force is released from the fifth keyboard key cap 458-5, the fifth rubber dome 462-5 exerts a force against the underside of the fifth keyboard key cap 458-5 forcing the fifth keyboard key cap 458-5 upward. This returns the fifth keyboard key 456-5 to its unactuated state similar to the unactuated state of the sixth keyboard key 456-6 shown in FIG. 4B.

Figure 5A:
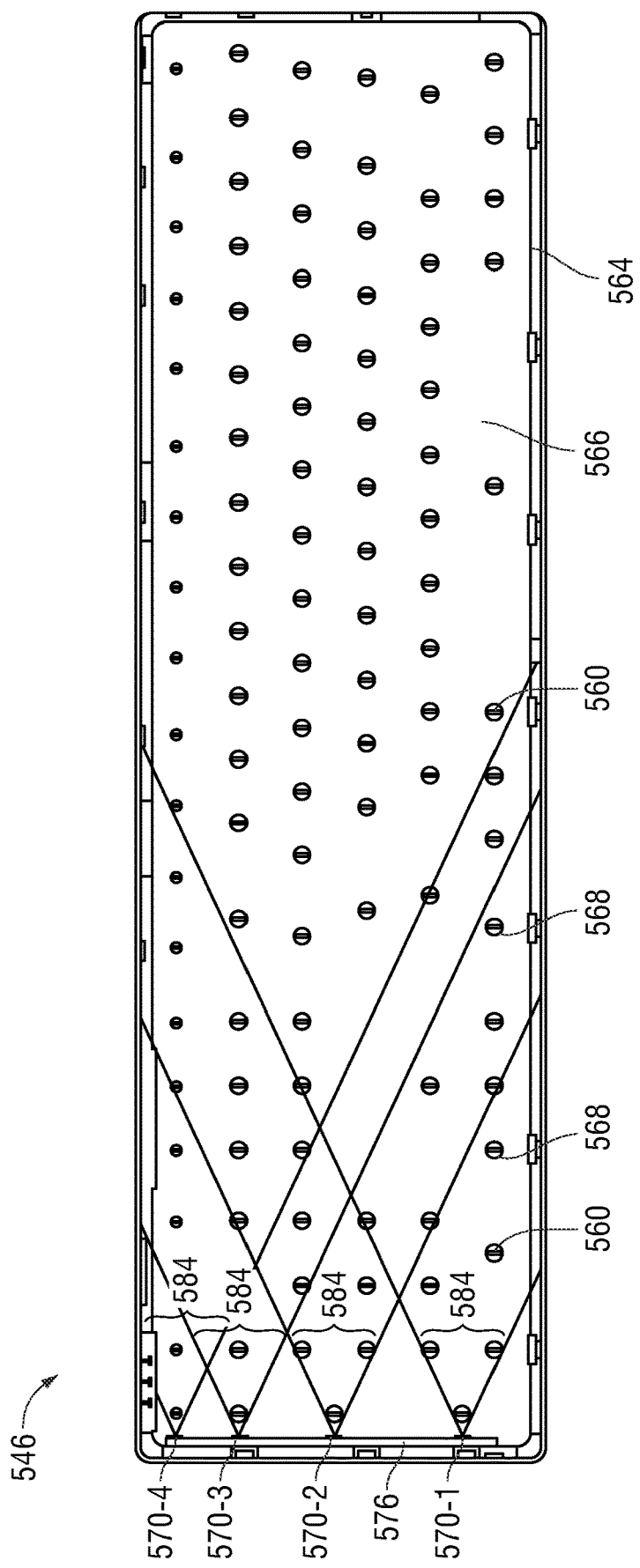
FIG. 5A is a bottom view of a keyboard support layer, a plurality of support layer vias, and a plurality of optical sensors to detect optical position of keyboard keys according to another embodiment of the present disclosure.
Figure 5B:
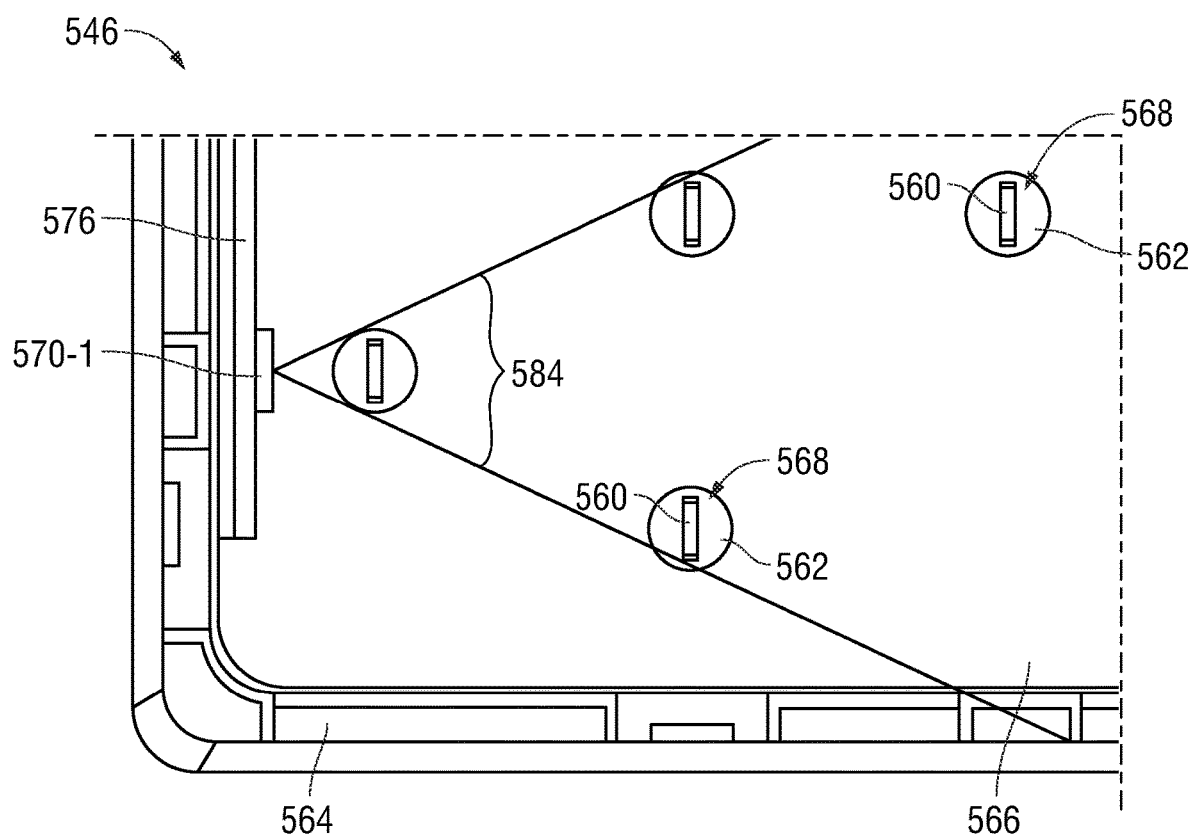
FIG. 5B is a bottom close-up view of a keyboard support layer, a plurality of support layer vias, and a plurality of optical sensors to detect optical position of keyboard keys according to another embodiment of the present disclosure.

FIG. 5A is a bottom view of a keyboard 546 including a support layer 566, a plurality of support layer vias 568, and a plurality of optical sensors 570-1, 570-2, 570-3, 570-4 to detect optical position of keyboard keys according to another embodiment of the present disclosure. FIG. 5A shows the keyboard 546 without a keyboard chassis to show the layout of the optical sensors 570-1, 570-2, 570-3, 570-4 on an optical sensor PCB 576 under the support layer 566 as described herein. FIG. 5B is also a bottom close-up view of a keyboard 546 including a support layer 566, a plurality of support layer vias 568, and a plurality of optical sensors 570-1, 570-2, 570-3, 570-4 to detect optical position of keyboard keys according to another embodiment of the present disclosure. FIG. 5B is an enlarged view of the bottom left corner of the underside of the keyboard 546 shown in FIG. 5A.

As described herein, the support layer 566 may include a plurality of support layer vias 568. In an embodiment, the support layer 566 may have a support layer via 568 for each keyboard key formed on the keyboard 546. Additionally, as described herein, each of the support layer vias 568 shown in FIGS. 5A and 5B show the individual key cap flanges 560 and rubber domes 562 formed above the support layer 566. Again, each key cap flange 560 and rubber dome 562 may be associated with an individual keyboard key of the keyboard 546.

FIG. 5A shows that the keyboard 546 includes four optical sensors 570-1, 570-2, 570-3, 570-4 with FIG. 5B showing an enlarged view of the first optical sensor 570-1 to detect optical position of keyboard keys. As described herein, the optical sensors 570-1, 570-2, 570-3, 570-4 may include TOF optical sensors. A TOF optical sensor may include visible or IR light beam emitter such as a LASER or light-emitting diode (LED). The TOF optical sensor may also include a light detector to detect when visible or IR light has been reflected back to the TOF optical sensor from off of each of the key cap flanges 560 as they extend below the support layer 566 when a user actuates a corresponding keyboard key. The TOF optical sensors may include, for example, a radio-frequency-modulated light sources with phase detectors, range gated imagers, direct time-of-flight imagers, among other types of TOF optical sensors.

In an embodiment, the keyboard 546 may include a plurality of optical sensors 570-1, 570-2, 570-3, 570-4 formed within the optical sensor cavity formed between the support layer 566 and the keyboard chassis (not shown). In an embodiment, each of these optical sensors 570-1, 570-2, 570-3, 570-4 may be used to detect a designated key set of keyboard keys. For example, a first optical sensor 570-1 may be used to monitor for the key cap flanges 560 of a first group of keyboard keys on the keyboard 546 while a second optical sensor 570-2 is used to monitor for the key cap flanges 560 of a second group of keyboard keys on the keyboard 546. In an embodiment, the keyboard 546 may be divided into four key sets with an optical sensor 570-1, 570-2, 570-3, 570-4 being used to monitor for key cap flanges 560 extending below the support layer 566 within its respective key sets. Through the use of the TOF optical sensors, a distance of each detected key cap flange 560 may be determined for a key in a designated key set having a field-of-view reflective vector to the TOF optical sensor. These key cap flanges 560 of the keyboard keys that fall outside of the key set to be detected by the TOF optical sensor or which could be obstructed by another key flange may be ignored so that another, assigned TOF optical sensor having an unobstructed field-of-view vector to the key cap flange 560 in a zone may detect that key cap flange 560 instead. In an embodiment, each of the optical sensors 570-1, 570-2, 570-3, 570-4 includes a field of view 584 that allows the respective optical sensor 570-1, 570-2, 570-3, 570-4 an reflection vector to detect reflection from these key cap flanges 560.

As each optical sensor 570-1, 570-2, 570-3, 570-4 detects a key cap flange 560 extending down past the support layer 566 due to a user actuating a keyboard key, time-of-flight may be used to identify which keyboard key of a designated set of keys was actuated. If the time-of-flight is longer, the detected key cap flange 560 is further away. If the time-of-flight is shorter, the key cap flange 560 is relatively closer to the respective optical sensor 570-1, 570-2, 570-3, 570-4. Because each optical sensor 570-1, 570-2, 570-3, 570-4 is assigned to a designated key set, the number of key cap flanges 560 to be detected is reduced thereby allowing for a relatively quicker identification of the actuated keyboard key. The optical sensor field of view 584, in some embodiments, may be limited to cause the optical sensors 570-1, 570-2, 570-3, 570-4 to be placed with an unobstructed reflection vector to monitor its designated key set and a set of known TOF distances to the keys in the key set only so that other key cap flanges 560 and keyboard keys that are not assigned to that key set are not detected. Each key cap flange 560 in a designated key set may have a unique TOF distance in an embodiment. In some embodiments, multiple optical sensors 570-1, 570-2, 570-3, 570-4 may be used to triangulate the position of the detected key cap flanges 560 or to confirm that a key cap flange 560 was detected at a specific location across the keyboard 546.

As the optical sensors 570-1, 570-2, 570-3, 570-4 receive this distance and optical position data of the key cap flanges 560, the distance and optical position data is sent to a hardware processing device such as a keyboard microcontroller (not shown). In an embodiment, the time-of-flight data that defines the key cap flange 560 and keyboard key cap location may be cross-referenced with a keystroke look-up table for each optical sensor. This keystroke look-up table may indicate a key code associated with a detected time-of-flight such that the keyboard microcontroller (not shown) can transmit this key code to the information handling system either via a wired connection or wireless as described herein. This key code may be received by a hardware processor of the information handling system and used as input keystroke data.

Figure 6:
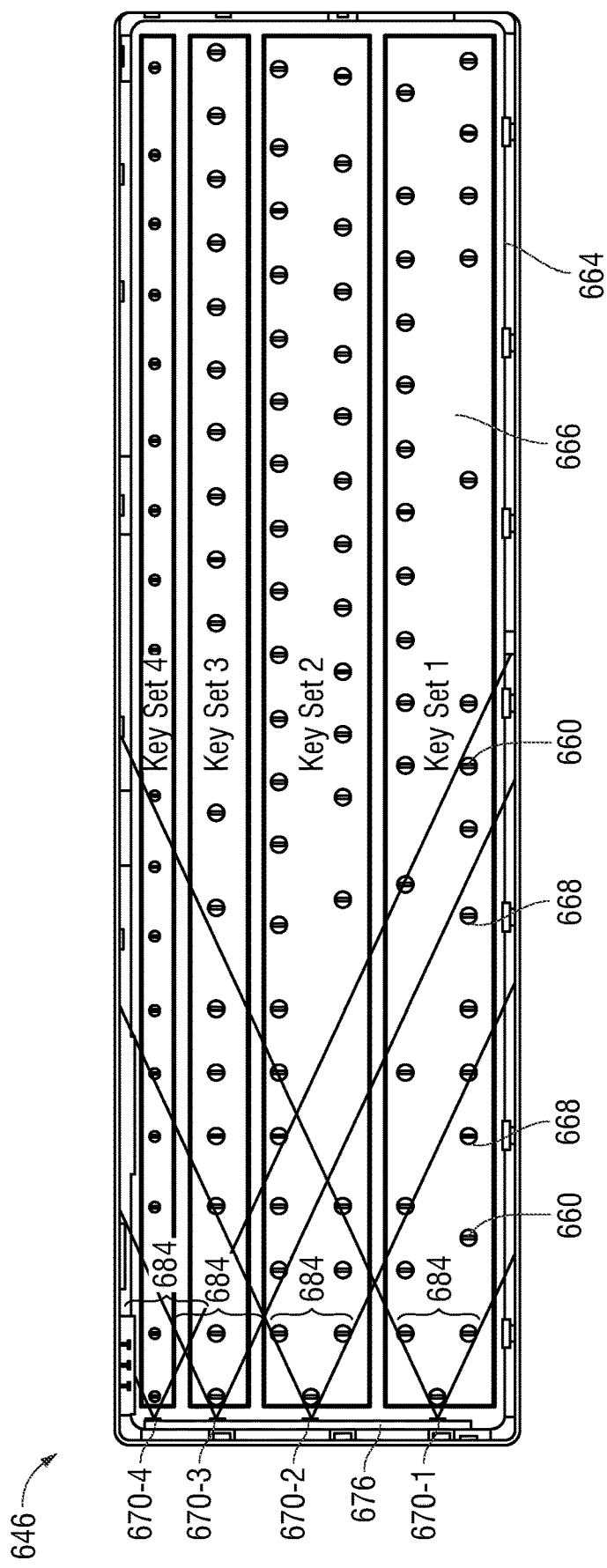
FIG. 6 is a bottom view of a keyboard including a support layer, a plurality of support layer vias, and a plurality of optical sensors showing optical matrix key positioning to detect optical position of keyboard keys with covered key sets defined thereon according to another embodiment of the present disclosure.

FIG. 6 is a bottom view of a keyboard 646 including a support layer 666, a plurality of support layer vias 668, and a plurality of optical sensors 670-1, 670-2, 670-3, 670-4 with key sets defined thereon for optical matrix key positioning according to another embodiment of the present disclosure. As described herein, the optical sensors 670-1, 670-2, 670-3, 670-4 may include TOF optical sensors. A TOF optical sensor may include a visible or IR light beam emitter such as a laser or light-emitting diode (LED). The TOF optical sensor may also include a light detector to detect when visible or IR light has been reflected back to the TOF optical sensor from off of each of the key cap flanges 660 as they extend below the support layer 666 when a user actuates a corresponding keyboard key. The TOF optical sensors may include, for example, a radio-frequency-modulated light sources with phase detectors, range gated imagers, direct time-of-flight imagers, among other types of TOF optical sensors.

In an embodiment, the keyboard 646 may include a plurality of optical sensors 670-1, 670-2, 670-3, 670-4 formed within the optical sensor cavity formed between the support layer 666 and the keyboard chassis (not shown). In an embodiment, each of these optical sensors 670-1, 670-2, 670-3, 670-4 may be used to detect a key set of keyboard keys having a reflection vector back to the respective optical sensor. For example, a first optical sensor 670-1 may be used to monitor for the key cap flanges 660 of a first group of keyboard keys on the keyboard 646. This first group of keyboard keys is labeled in FIG. 6 as "Key set 1" and may include one or more rows of keyboard keys on the keyboard 646 having a reflection vector back to the respective optical sensor. Similarly, a second optical sensor 670-2 is used to monitor for the key cap flanges 660 of a second group of keyboard keys on the keyboard 646 labeled as "Key set 2" in FIG. 6. A third optical sensor 670-3 is used to monitor for the key cap flanges 660 of a third group of keyboard keys on the keyboard 646 labeled as "Key set 3" in FIG. 6. Additionally, a fourth optical sensor 670-4 is used to monitor for the key cap flanges 660 of a fourth group of keyboard keys on the keyboard 646 labeled as "Key set 4" in FIG. 6. As such, in the embodiment shown in FIG. 6, the keyboard 646 may be divided into four key sets (e.g., Key sets 1, 2, 3, and 4) with a optical sensor 670-1, 670-2, 670-3, 670-4 being used to monitor for key cap flanges 660 extending below the support layer 666 within its respective key sets having a reflection vector back to the respective optical sensor and known TOF distances from each of the corresponding optical sensors 670-1, 670-2, 670-3, 670-4. Through the use of the TOF optical sensors, a distance of each detected key cap flange 660 may be determined via a keyboard microcontroller. Any of the key cap flanges 660 of the keyboard keys that fall outside of the key set TOF distances to be detected by any given TOF optical sensor may be ignored so that another, assigned TOF optical sensor may detect that key cap flange 660 having a reflection vector back to that respective optical sensor instead. In an embodiment, each of the optical sensors 670-1, 670-2, 670-3, 670-4 includes a field of view 684 that allows the respective optical sensor 670-1, 670-2, 670-3, 670-4 to detect these key cap flanges 660 having an unobstructed reflection vector back to the respective optical sensor.

As each optical sensor 670-1, 670-2, 670-3, 670-4 detects a key cap flange 660 extending down past the support layer 666 due to a user actuating a keyboard key with optical matrix key positioning, time-of-flight may be used to identify which keyboard key in an assigned key set was actuated. If the time-of-flight is longer, the detected key cap flange 660 is further away. If the time-of-flight is shorter, the key cap flange 660 is relatively closer to the respective optical sensor 670-1, 670-2, 670-3, 670-4. Any unexpected TOF distances are ignored as part of another key set for a different TOF optical sensor. Because each optical sensor 670-1, 670-2, 670-3, 670-4 is assigned to a key set, the number of key cap flanges 660 to be detected is reduced and has specific distances from the optical sensor thereby allowing for a relatively quicker identification of the actuated keyboard key. The optical sensor field of view 684, in some embodiments, may be limited to cause the optical sensors 670-1, 670-2, 670-3, 670-4 to monitor its key set only at set TOF distances from that optical sensor so that other key cap flanges 660 and keyboard keys not assigned to that key set are not detected. In some embodiments, multiple optical sensors 670-1, 670-2, 670-3, 670-4 may be used to triangulate the position of the detected key cap flanges 660 or to confirm that a key cap flange 660 was detected at a specific location across the keyboard 646.

As the optical sensors 670-1, 670-2, 670-3, 670-4 receive this distance and optical position data of the key cap flanges 660, the distance and optical position data is sent to a hardware processing device such as a keyboard microcontroller (not shown). In an embodiment, the time-of-flight data from a particular TOF optical sensor defines the key cap flange 660 and keyboard key cap location that may be cross-referenced with a keystroke look-up table. This keystroke look-up table may indicate a key code associated with a detected time-of-flight such that the keyboard microcontroller (not shown) can transmit this key code to the information handling system either via a wired connection or wireless as described herein. This key code may be received by a hardware processor of the information handling system and used as keystroke input data.

Figure 7:
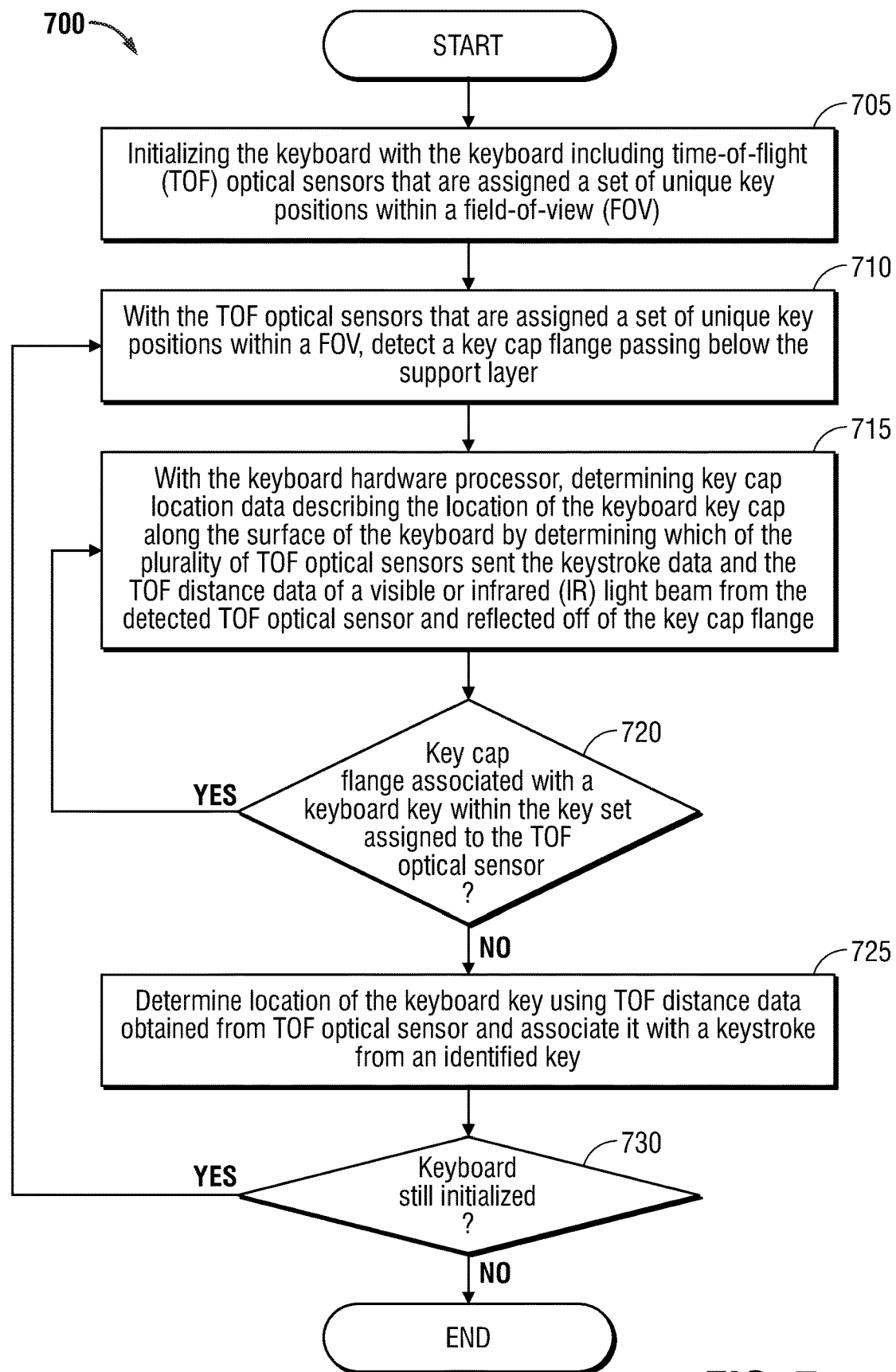
FIG. 7 is a block flow diagram illustrating a method of operating a keyboard with optical matrix key positioning according to an embodiment of the present disclosure.

FIG. 7 is a block flow diagram illustrating a method 700 of operating a keyboard using optical matrix key positioning according to an embodiment of the present disclosure. The method 700 may include initializing the keyboard. The initialization of the keyboard may include a user actuating a power button or switch to cause power to be provided to, at least, the keyboard microcontroller. In an alternative embodiment where the keyboard is a wired keyboard, the initialization of the keyboard may include powering on of an operatively coupled information handling system and executing a keyboard driver associated with the keyboard by the hardware processor of the information handling system so that the bus of the information handling system may communicate with the keyboard microcontroller.

As described herein, the keyboard includes a plurality of optical sensors with key sets defined thereon. As described herein, the optical sensors may include TOF optical sensors. These TOF optical sensors may include a visible or IR light beam emitter such as a LASER or LED. The TOF optical sensors may also include a visible or IR light detector to detect when light has been reflected back to the TOF optical sensor from off of each of the key cap flanges as they extend below the support layer when a user actuates a corresponding keyboard key. The TOF optical sensors may include, for example, a radio-frequency-modulated light sources with phase detectors, range gated imagers, direct time-of-flight imagers, among other types of TOF optical sensors. In an embodiment, each of the optical sensors includes a field of view with reflection vectors that allow the respective optical sensor to detect these key cap flanges in a designated set of keys via the optical matrix key positioning and TOF distance determination for optical position of keyboard keys.

At block 710, the TOF optical sensors may monitor for and detect a key cap flange passing below the support layer. It is appreciated that each of the plurality of TOF optical sensors may be assigned a specific key set as described in connection with FIG. 6. For example, in an embodiment that includes four TOF optical sensors, a first TOF optical sensor may be used to monitor for the key cap flanges of a first group of keyboard keys on the keyboard. This first group of keyboard keys (e.g., as labeled in FIG. 6 as "Key set 1") may include one or more rows of keyboard keys on the keyboard. Similarly, a second TOF optical sensor is used to monitor the key cap flanges of a second group of keyboard keys on the keyboard (e.g., as labeled as "Key set 2" in FIG. 6). A third optical sensor is used to monitor for the key cap flanges of a third group of keyboard keys on the keyboard 646 (e.g., as labeled "Key set 3" in FIG. 6). Additionally, a fourth optical sensor is used to monitor for the key cap flanges of a fourth group of keyboard keys on the keyboard (e.g., as labeled as "Key set 4" in FIG. 6). As such, the keyboard may be divided into four key sets (e.g., Key sets 1, 2, 3, and 4) each with an optical sensor being used to monitor for key cap flanges extending below the support layer within its respective key sets. Through the use of the TOF optical sensors, a distance of each detected key cap flange may be determined and the key cap flange of the keyboard keys in an assigned key set. Any TOF distance that falls outside of the key set to be detected by any given TOF optical sensor may be ignored so that another, assigned TOF optical sensor may be designated to detect that key cap flange instead. In an embodiment, each of the optical sensors includes a field of view with a reflection vector that allows the respective optical sensor to detect these key cap flanges and determine TOF distance for optical position data of the associated keyboard keys.

The method 700 further includes, at block 715, determining key cap optical position data describing the optical position of the keyboard key cap along the surface of the keyboard by determining which of the plurality of TOF optical sensors sent the keystroke data and the TOF distance data of a visible or IR light beam (e.g., laser light or LED light) from the detected TOF optical sensor and reflected off of the key cap flange. As described herein, the TOF optical sensors may be operatively coupled to an optical sensor PCB which is used as a support structure to arrange the TOF optical sensors within the optical sensor cavity formed between the support layer and the keyboard chassis. The optical sensor PCB may also include circuitry that allows data transmission between the TOF optical sensors to a keyboard microcontroller formed on a main keyboard PCB. As such the optical sensor PCB may include an electrical connection such as a flex ribbon or connector that operatively couples the TOF optical sensors and optical sensor PCB to the main keyboard PCB and the keyboard microcontroller. In an embodiment, the TOF optical sensors and optical sensor PCB is placed at a right-most keyboard chassis wall such that each of the optical sensors may have a field of view that is horizontal in order to detect the key cap flanges of an assigned set of keys that extend down below the bottom surface of the support layer to determine optical position of designated keyboard keys. As the optical sensors receive reflection and the TOF distance and optical position data of the key cap flanges are determined as detected by the TOF optical sensors and determined by the keyboard microcontroller.

At block 720, the method 700 includes the keyboard microcontroller determining whether the key cap flange associated with a keyboard key and detected by a given TOF optical sensor is within a key set assigned to that TOF optical sensor. In an example embodiment, the keyboard microcontroller may do this by determining if the TOF data received from this TOF optical sensor matches any expected TOF distance for the key cap flange detected by the TOF optical sensor that falls within the distances for that TOF optical sensor for its set of keys. If the TOF distance data does not match an expected TOF distance data associated with those keyboard keys within the key set assigned to the TOF optical sensor (e.g., time-of-flight too slow or too fast), the method 700 may return to block 715 for the TOF optical sensor to ignore the detection of the key cap flange and continue to monitor for key cap flanges the extend below the support layer described herein. It is appreciated that because there are multiple TOF optical sensors used to detect key cap flanges, multiple TOF optical sensors may concurrently detect the passage of a key cap flange below the support layer. Where TOF distance data does not match an expected TOF data, the keyboard microcontroller may disregard this TOF distance data received from that specific TOF optical sensor. In an embodiment, the keyboard microcontroller may compare the TOF distance data received from the TOF optical sensor to, for example, a look-up table that indicates an expected time-of-flight data for each key cap flange assigned to the TOF optical sensor and within the key set associated with the TOF optical sensor. By comparing the TOF data received by any given TOF optical sensor to the TOF distance data on the look-up table the keyboard microcontroller may determine whether to ignore or process the TOF data received from any of the given TOF optical sensors. Thus, although a plurality of TOF optical sensors may detect the presence of a key cap flange, only that TOF distance data received from a TOF optical sensor assigned to detect that key cap flange is used to identify the location of the key cap flange and the corresponding keyboard key on the keyboard.

Where, at block 720, this TOF distance data does match an expected TOF distance data associated with those keyboard keys within the key set assigned to the TOF optical sensor (e.g., time-of-flight data matches an expected time-of-flight for any given key cap flange assigned to the TOF optical sensor and within the assigned key set), the method 700 may proceed to block 725.

At block 725, because the keyboard microcontroller has determined that the TOF distance data matches an expected TOF distance data associated with a key cap flange assigned to the TOF optical sensor, the keyboard microcontroller may continue to use the look-up table to determine the location of the keyboard key on the keyboard using the obtained TOF distance data from the TOF optical sensor. Again, this look-up table may include expected TOF distance data that is associated with each key cap flange assigned to the TOF optical sensor and within that key set the TOF optical sensor is associated with. Because the TOF distance data has been found on this look-up table, the look-up table may include a key code associated with that detected TOF distance data.

The keyboard microcontroller may process this optical position data and send out the determined key code associated with the detected key cap flange to the information handling system. The keyboard microcontroller can transmit this key code to the information handling system either via a wired connection or wireless connection as described herein. This key code may be received by a hardware processor (e.g., FIG. 1, 102) of the information handling system and used as keystroke input data form the determined keyboard key.

At block 730, the method 700 includes determining whether the keyboard is still initialized. The keyboard may cease being initialized when, for example, a user switches the power switch on the keyboard. In the example where the keyboard is a wired keyboard, the keyboard may cease to be initialized when the keyboard driver is stopped and/or the information handling system is turned off. Where the keyboard is still initialized, the method 700 proceeds to block 710 to perform the methods described herein. Where the keyboard is no longer initiated, the method 700 may end.

The blocks of the flow diagrams of FIG. 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A keyboard operatively couplable to an information handling system comprising:
  a keyboard key cap of a keyboard key of a plurality of keyboard keys arranged in a plurality of rows on the keyboard, where the keyboard key cap includes a key cap flange extending from a bottom surface of the keyboard key cap;
  a plastic layer comprising a rubber dome formed under the keyboard key cap at a key location on the keyboard;
  a support layer formed under the plastic layer, the support layer including a key cap flange via for the key cap flange to pass through to an optical sensor cavity in a keyboard chassis when the keyboard key cap is actuated by a user;
  a bottom chassis formed under the support layer to house a plurality of optical time of flight (TOF) sensors in the optical sensor cavity to detect the key cap flange extending through the support layer in the key cap flange, wherein each optical TOF sensor has an assigned key set of keys from the plurality of rows on the keyboard where each of the assigned key set has key cap flanges in a field of view for reflecting light within the optical sensor cavity to a corresponding optical TOF sensor; and
  a keyboard microcontroller to detect an active optical TOF sensor of the plurality of optical TOF sensors detecting reflection of light from the key cap flange within a field of view for the plurality of optical TOF sensors to identify the keyboard key actuated based on a TOF distance corresponding to selection of the keyboard key from the assigned key set for that active optical TOF sensor.

2. The keyboard of claim 1 further comprising:
  a plurality of rubber domes for the plurality of keyboard keys affixed to the plastic layer via an injection molding process forming the plastic layer.

3. The keyboard of claim 1 further comprising:
  the optical TOF sensor emits a visual light or infrared (IR) light beam and detects reflected visual light or IR light reflected from off of the key cap flange and uses a calculated TOF distance of the keyboard key cap from the TOF optical sensor to determine which key in the assigned key set on the keyboard is the keyboard key actuated.

4. The keyboard of claim 1 further comprising:
  the plurality of optical TOF sensors each have a field of view assigned to a designated subset of keyboard keys from the plurality of rows of the keyboard to detect an actuation of each of a plurality of key cap flanges extending through a plurality of key cap flange vias within that field of view, wherein the optical sensor determines which keyboard key from the assigned key set from the plurality of rows based on determined TOF distance to the keycap flange for that keyboard key in the assigned key set an in the corresponding field of view.

5. The keyboard of claim 1 further comprising:
  a keyboard microcontroller to receive input from the optical sensor to determine the key location of the keyboard key actuated by the user and provide the corresponding keystroke input to the information handling system.

6. The keyboard of claim 1, wherein actuation of the keyboard key cap by a user causes a bottom surface of the keyboard key cap to be cushioned by the rubber dome and the key cap flange does not contact the key cap flange via in the support layer to limit noises associated with the actuation of the keyboard key.

7. The keyboard of claim 1 further comprising:
a sealed interface between a key cap channel cavity and the rubber dome of the plastic layer to prevent contamination into the keyboard.

8. A method of operating a keyboard comprising:
with a keyboard microcontroller, receiving keystroke data from a first time-of-flight (TOF) optical sensor of a plurality of TOF optical sensors, where the first TOF optical sensor that detects a plurality of key cap flanges of an assigned key set of keyboard key caps within different rows of the keyboard layout within a field of view of a first TOF optical sensor by detecting a reflected beam of visible or infrared (IR) light emitted from the first TOF optical sensor of the plurality of TOF optical sensors along a side of a keyboard chassis, where the plurality of TOF optical sensors emit visible or IR light and detect visible or IR light;
with the keyboard microcontroller, determining key cap optical position data describing the location of a keyboard key cap in the assigned key set along the surface of the keyboard by determining that the first TOF optical sensor of the plurality of TOF optical sensors sent the keystroke data, the assigned key set for first TOF optical sensor, and the TOF distance of a key cap flange depressed with the keystroke from assigned key set detected from the first TOF optical sensor of reflected visible or IR light off of the depressed key cap flange; and
with the keyboard microcontroller, cross-referencing first TOF optical sensor and its assigned keyset with the TOF distance of that keycap flange for a key cap location with a key code on a keystroke look-up table and transmitting a determined key code for the depressed keycap to a hardware processor of an information handling system.

9. The method of claim 8 further comprising:
with the keyboard microcontroller, determining which TOF optical sensor of the plurality of TOF optical sensors in the keyboard chassis is detecting the reflected visible or IR light and its assigned key set among a plurality of key sets for each of the plurality of TOF optical sensors of a plurality of keyboard keys across plural rows on the keyboard.

10. The method of claim 8, further comprising:
actuating a keyboard key such that a rubber dome under the keyboard key cap is actuated, where the rubber dome is affixed to a plastic layer formed via an injection molding process and receives the key cap flange through a hole in the rubber dome.

11. The method of claim 8, further comprising:
actuating the keyboard key cap by a user causes a bottom surface of the keyboard key cap to be cushioned by a rubber dome and passes the key cap flange through a keycap flange via in a support layer of the keyboard without contact to limit noise associated with the actuation of the keyboard key cap.

12. The method of claim 8, wherein the keyboard comprises a sealed interface between an underside of the key cap and a rubber dome to prevent contamination into the keyboard.

13. The method of claim 8, further comprising:
each TOF optical sensor among the plurality of TOF optical sensors having an assigned field of view defining its corresponding assigned key set, with reach assigned key set including keys across a plurality of rows of keyboard keys of the keyboard within a field of view of each TOF optical sensor to detect an actuation of the key cap flanges extending to an optical sensor cavity via formed below a support layer placed above the plurality of TOF optical sensors and the optical sensor cavity.

14. A keyboard comprising:
a plurality of keyboard keys across plural rows of the keyboard keys of a keyboard;
a plurality of keyboard key caps of each of the keyboard keys, each keyboard key placed at a key location across the plural rows on the keyboard, wherein each of the keyboard key caps includes a key cap flange extending from a bottom surface of each of the keyboard key caps;
a support layer formed under the plurality of keyboard keys, wherein the support layer includes a plurality of key cap flange vias for each of the plurality of key cap flanges to pass through into an optical sensor cavity in a keyboard chassis when each of the plurality of keyboard key caps is actuated;
a bottom chassis formed under the support layer to enclose the optical sensor cavity to house a plurality of optical time of flight (TOF) sensors emit visible or infrared light and to detect key cap flanges extending during keyboard key actuation through the support layer based on reflection of the visible or IR light off of the key cap flange in the optical sensor cavity to identify actuation of each keyboard key;
each optical TOF sensor detecting an assigned key set is subset of keys from a plurality of rows of keyboard keys, where each key in the assigned key set have key cap flanges within a field of view for reflected visible or IR light by the corresponding TOF sensor having that assigned key set and the assigned key set for each optical TOF sensor having a set of TOF distances unique to each key within the assigned key set for each of the plurality of TOF sensors; and
a keyboard microcontroller to identity an active optical TOF sensor of a plurality of optical TOF sensors detects reflected visible or IR light and determine that a depressed key in the assigned key set from the plural rows of keys corresponds to a detected TOF distance of the reflected visible or IR light at the active optical TOF sensor to record a keystroke of the depressed key.

15. The keyboard of claim 14 further comprising:
a plastic layer formed under the keyboard key cap, where the plastic layer includes a plurality of rubber domes at each of the key locations on the keyboard and formed under each of the keyboard key caps and receiving the key cap flange of each keyboard key cap.

16. The keyboard of claim 15 further comprising:
the rubber domes operatively coupled to the plastic layer via an injection molding process forming the plastic layer.

17. The keyboard of claim 14 further comprising:
the plurality of optical TOF sensors each emit an IR light beam and detect reflected IR light reflected from off key cap flanges of a subset of keyboard keys that are the assigned key set associated with each optical TOF sensor of the plurality of optical TOF sensor, where each optical TOF sensor determines the TOF distance of the key cap flange to identify the keyboard key from the assigned key set actuated on the keyboard.

18. The keyboard of claim 14 further comprising:
the plurality of optical TOF sensors each have a field of view assigned to monitor its assigned key set from plural rows of the keyboard keys with flanges in that field of view to detect an actuation of each of the plurality of key cap flanges of that assigned keyset extending through the plurality of key cap flange vias in the support layer.

19. The keyboard of claim 14 further comprising:
the keyboard microcontroller to receive input from a first optical TOF sensor to determine a TOF distance of a first key cap flange actuated by a user from the assigned key set of the first optical TOF sensor and determine a corresponding keystroke input data for a first keyboard key associated with the first key cap flange from that assigned key set for the first optical TOF sensor to the information handling system.

20. The keyboard of claim 14, wherein actuation of a keyboard key cap by a user causes the key cap flange to pass through a key cap flange via in the support layer without contact to limit noise associated with the actuation of the keyboard key cap.

* * * * *